US012754367B2

(12) United States Patent
Tanaka et al.

(10) Patent No.: US 12,754,367 B2
(45) Date of Patent: Oct. 6, 2026

(54) TECHNOLOGIES FOR SIGNAL AMPLIFICATION FOR A PHOTONIC INTEGRATED CIRCUIT

(71) Applicant: Intel Corporation, Santa Clara, CA (US)

(72) Inventors: Hiroki Tanaka, Gilbert, AZ (US); Bai Nie, Chandler, AZ (US); Kristof Darmawikarta, Chandler, AZ (US); Hari Mahalingam, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 239 days.

(21) Appl. No.: 17/733,302

(22) Filed: Apr. 29, 2022

(65) Prior Publication Data

US 2023/0350131 A1 Nov. 2, 2023

(51) Int. Cl.
*G02B 6/122* (2006.01)
*G02B 6/12* (2006.01)
*G02B 6/30* (2006.01)

(52) U.S. Cl.
CPC ............... *G02B 6/122* (2013.01); *G02B 6/30* (2013.01); *G02B 2006/12038* (2013.01); *G02B 2006/12121* (2013.01); *G02B 2006/1215* (2013.01)

(58) Field of Classification Search
CPC .... G02B 6/136; G02B 6/122; G02B 6/12004; G02B 6/30
See application file for complete search history.

(56) References Cited

U.S. PATENT DOCUMENTS 10,797,462 B1 * 10/2020 Doerr ................. G02B 6/12004
11,119,219 B1 * 9/2021 LaChapelle .............. G02B 6/12
2014/0269800 A1 9/2014 Purnawirman et al.
2021/0159659 A1 * 5/2021 Bandyopadhyay .......................... H01S 3/094053

FOREIGN PATENT DOCUMENTS

EP 0440049 A1 8/1991
WO 9600996 A1 1/1996

OTHER PUBLICATIONS

EPO; Extended European Search Report issued in EP Patent Application No. 23157645.5, dated Sep. 28, 2023; 9 pages.
EPO Communication Pursuant to Article 94(3) EPC in EP Application Serial No. 23157645.5 mailed on Sep. 4, 2025 (7 pages).

* cited by examiner

*Primary Examiner* — Michael P Mooney
(74) *Attorney, Agent, or Firm* — Alliance IP, LLC

(57) ABSTRACT

Techniques for signal amplification for a photonic integrated circuit (PIC) die are disclosed. In the illustrative embodiment, an optical fiber is coupled to an input signal waveguide in a glass interposer, and an input signal waveguide of a PIC die is coupled to the input signal waveguide of the glass interposer. In order to compensate for any coupling losses, the input signal waveguide of the glass interposer is active, amplifying an input signal. Light in a pump waveguide near the input signal waveguide pumps ions in the input signal waveguide into a population inversion, allowing them to amplify the input signal.

25 Claims, 23 Drawing Sheets

TECHNOLOGIES FOR SIGNAL AMPLIFICATION FOR A PHOTONIC INTEGRATED CIRCUIT

BACKGROUND

Photonic integrated circuits (PICs) can be used for several applications, such as communications. Efficiently and cheaply aligning optics to couple light into and out of PICs can be a challenge. Approaches include using V-grooves to align a fiber connector or fabricating a lens attached to the PIC or interposer. However, these approaches can lead to a range of coupling losses, leading to poor performance or low yield.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
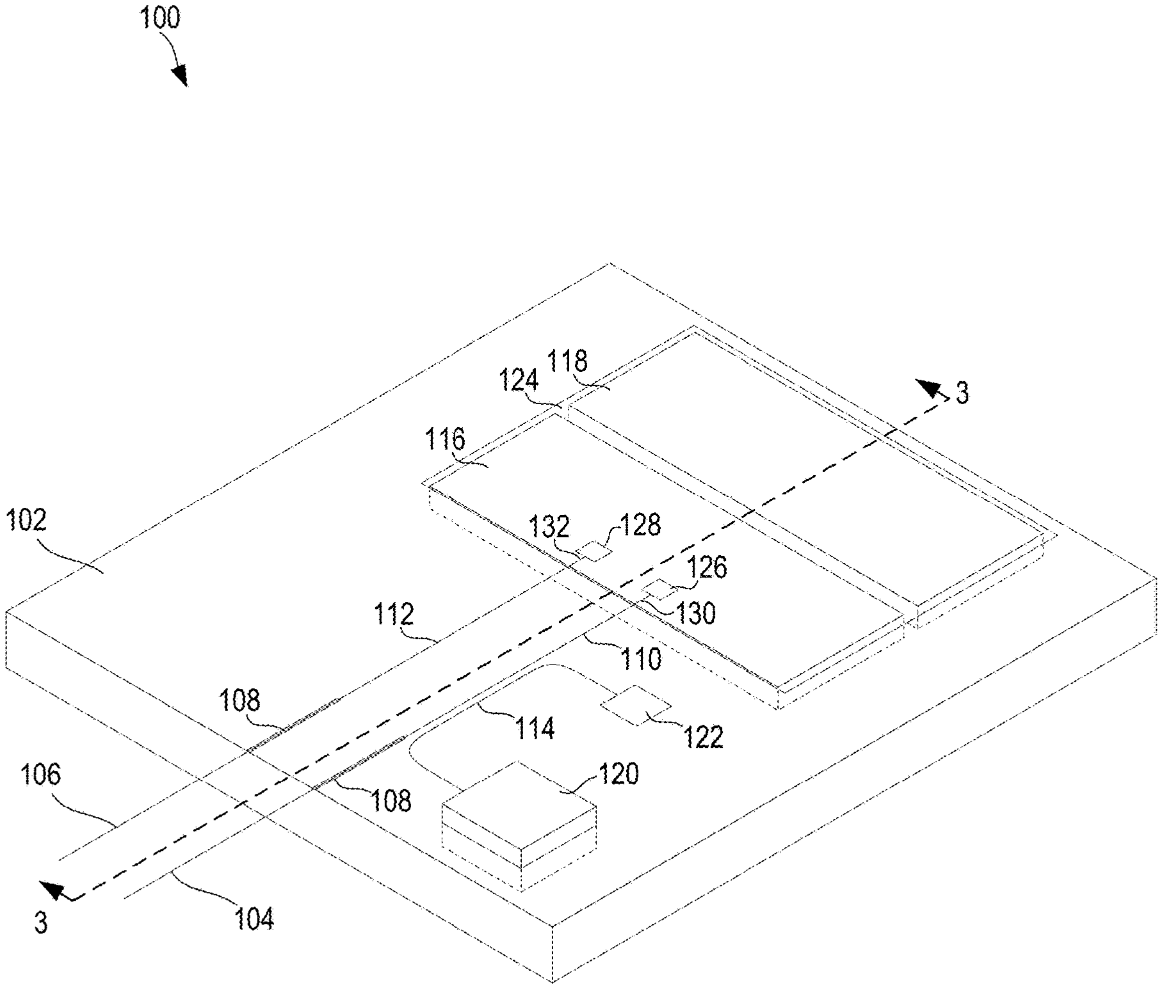
FIG. 1 is an isometric view of one embodiment of a system with a glass interposer with an active waveguide.

In the illustrative embodiment disclosed herein, a glass interposer connects optical fibers to signal waveguides in a photonic integrated circuit (PIC) die with signal waveguides defined in the glass interposer. In the illustrative embodiment, a pump waveguide is adjacent each of the signal waveguides. Light from a laser is coupled into the pump waveguides, and the light pumps ionized elements implanted in the signal waveguides, creating a population inversion. When signal light passes through the signal waveguides, it is amplified. The amplification can compensate for coupling loss from the optical fiber to the signal waveguides in the glass interposer and/or for coupling loss from the glass interposer to the PIC die.

As used herein, the phrase "communicatively coupled" refers to the ability of a component to send a signal to or receive a signal from another component. The signal can be any type of signal, such as an input signal, an output signal, or a power signal. A component can send or receive a signal to another component to which it is communicatively coupled via a wired or wireless communication medium (e.g., conductive traces, conductive contacts, air). Examples of components that are communicatively coupled include integrated circuit dies located in the same package that communicate via an embedded bridge in a package substrate and an integrated circuit component attached to a printed circuit board that send signals to or receives signals from other integrated circuit components or electronic devices attached to the printed circuit board.

In the following description, specific details are set forth, but embodiments of the technologies described herein may be practiced without these specific details. Well-known circuits, structures, and techniques have not been shown in detail to avoid obscuring an understanding of this description. Phrases such as "an embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact, and "coupled" may indicate elements co-operate or interact, but they may or may not be in direct physical or electrical contact. Optical components such as fibers or waveguides may be "connected" if the gap between them is small enough that light can be transferred from one fiber or waveguide to another fiber or waveguide without any intervening optical elements, such as a lens or mirror. Furthermore, the terms "comprising," "including," "having," and the like, as used with respect to embodiments of the present disclosure, are synonymous. Terms modified by the word "substantially" include arrangements, orientations, spacings, or positions that vary slightly from the meaning of the unmodified term. For example, the central axis of a magnetic plug that is substantially coaxially aligned with a through hole may be misaligned from a central axis of the through hole by several degrees. In another example, a substrate assembly feature, such as a through width, that is described as having substantially a listed dimension can vary within a few percent of the listed dimension.

It will be understood that in the examples shown and described further below, the figures may not be drawn to scale and may not include all possible layers and/or circuit components. In addition, it will be understood that although certain figures illustrate transistor designs with source/drain regions, electrodes, etc. having orthogonal (e.g., perpendicular) boundaries, embodiments herein may implement such boundaries in a substantially orthogonal manner (e.g., within +/−5 or 10 degrees of orthogonality) due to fabrication methods used to create such devices or for other reasons.

Reference is now made to the drawings, which are not necessarily drawn to scale, wherein similar or same numbers may be used to designate the same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives within the scope of the claims.

As used herein, the phrase "located on" in the context of a first layer or component located on a second layer or component refers to the first layer or component being directly physically attached to the second part or component (no layers or components between the first and second layers or components) or physically attached to the second layer or component with one or more intervening layers or components.

Figure 2:
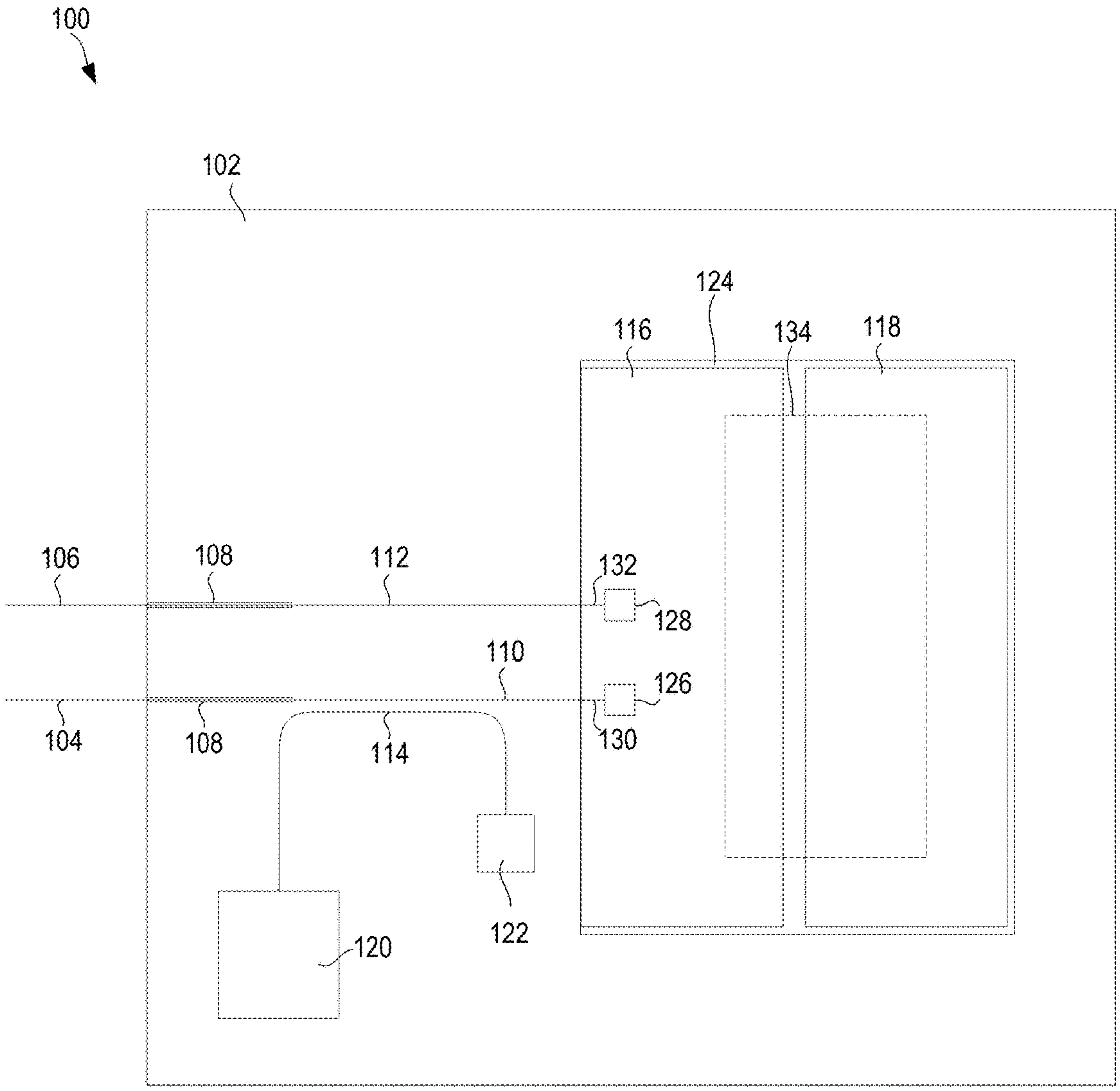
FIG. 2 is a top-down view of the system of FIG. 1.
Figure 3:
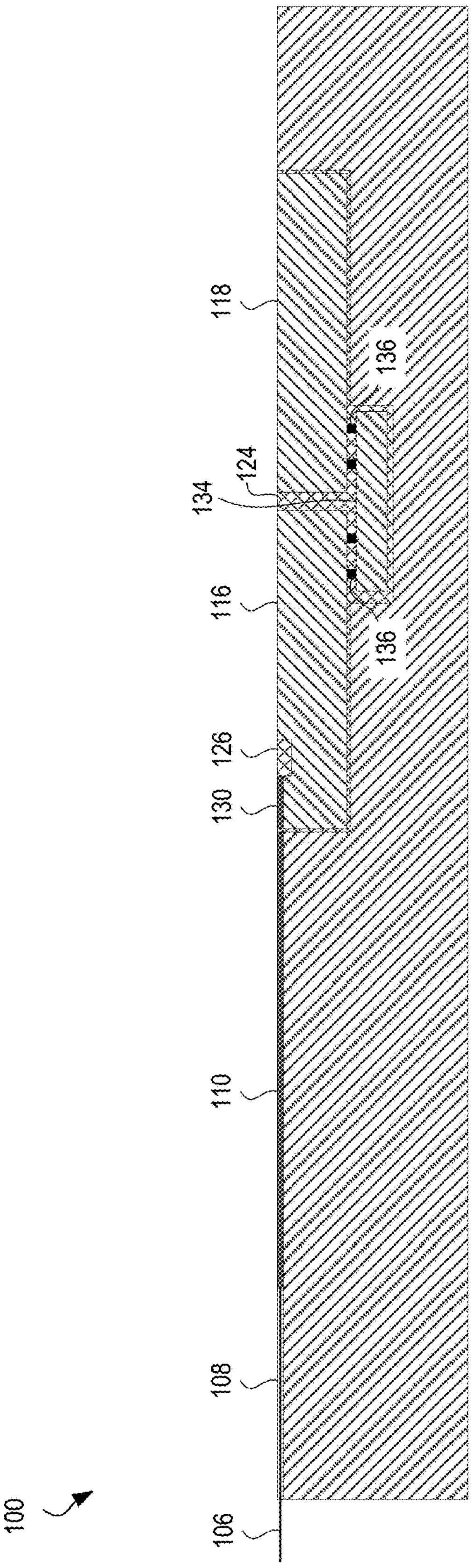
FIG. 3 is a cross-sectional view of the system of FIG. 1.

Referring now to FIGS. 1-3, in one embodiment, a system 100 includes a glass interposer 102. FIG. 1 shows an isometric view of the system 100, FIG. 2 shows a top-down view of the system 100, and FIG. 3 shows a cross-sectional view of the system 100 taken at the line 3 shown in FIG. 1. The illustrative system 100 includes an input optical fiber 104 and an output optical fiber 106. Each optical fiber 104, 106 is disposed in a V-groove 108 defined in the top surface of the glass interposer 102. The input optical fiber 104 is connected to an input signal waveguide 110, and the output optical fiber 106 is connected to an output signal waveguide 112. The input signal waveguide 110 may contain dopants such as erbium or praseodymium that, when pumped by a pump laser 120, can amplify a signal in the input signal waveguide 110.

The glass interposer 102 also includes a pump waveguide 114, which is positioned close to and runs parallel to the input signal waveguide 110 for at least part of its length. An output of a laser 120 is connected to the pump waveguide 114. In the illustrative embodiment, when the pump waveguide 114 is close to the input signal waveguide, the mode of the light in the pump waveguide 114 overlaps with the input signal waveguide 110, pumping the dopants into a population inversion. The pump waveguide 114 is also connected to a termination block 122 to absorb any remaining light.

A photonic integrated circuit (PIC) die 116 is disposed in a cavity defined in the glass interposer 102. An input signal waveguide 130 of the PIC die 116 is connected to the input signal waveguide 110 of the glass interposer 102, and an output signal waveguide 132 of the PIC die 116 is connected to the output signal waveguide 112 of the glass interposer 102. The input signal waveguide 130 of the PIC die 116 is connected to a detector 126, and the output signal waveguide 132 of the PIC die 116 is connected to a laser 128 or other light source.

In the illustrative embodiment, the PIC die 116 is communicatively coupled to an electrical integrated circuit (EIC) die 118 positioned in a cavity of the glass interposer 102. The PIC die 116 can be coupled to the EIC die 118 by embedded multi-die interconnect bridge (EMIB) 134 or other interconnect 134 by one or more connections 136. An epoxy 124 or other material may fill any space in between the glass interposer 102, the PIC die 116, the EIC die 118, and/or the EMIB 134.

In use, an input signal is transmitted on the input optical fiber 104. The input signal may be from, e.g., a router, a switch, a remote compute device, a nearby component, a component on a rack, blade, or sled in a data center, and/or from any other suitable source. The input signal may carry a digital or analog signal. The input signal may be at any suitable wavelength, such as 800-1,800 nanometers. In the illustrative embodiment, the input signal has a center wavelength between 1260-1360 nanometers for an O-band signal or between 1530-1565 nanometers. In other embodiments, the input signal may be, e.g., an S-band signal or an L-band signal. The input signal may have any suitable bandwidth, such as 1 gigahertz to 20 terahertz. The input signal is coupled from the input optical fiber 104 to the input signal waveguide 110. Due to misalignment, the input signal may have a coupling loss of, e.g., 0.1-60 dB. The input signal may have any suitable power, such as −30 to 30 dBm.

The pump laser 120 generates light and directs it into the pump waveguide 114. The mode of the light in the pump waveguide 114 overlaps with the ions in the input signal waveguide 110. The ions, which may be, e.g., a 3-level or 4-level system, enter a population inversion for a transition corresponding to the energy of signal light in the input signal waveguide 110. The pump laser 120 may be at any suitable wavelength, such as 750-1,750 nanometers. In the illustrative embodiment, the pump laser 120 has a wavelength that is lower than that of the input signal. For example, if the input signal has a center wavelength in the O-band, the pump laser 120 may have a wavelength of, e.g., 1010-1040 nm. If the input signal has a center wavelength in the C-band, the pump laser 120 may have a wavelength of, e.g., 980 nm or 1480 nm. The pump laser 120 may have any suitable power, such as −30 to 30 dBm.

When the pump laser 120 is active and the ions in the input signal waveguide 110 are in a population inversion, the input signal in the input signal waveguide 110 is amplified. The input signal may be amplified by any suitable amount, such as 1-60 dB (although the amplification may be smaller for a higher input signal power). The amplification in the input signal waveguide 110 can compensate for some or all of the coupling loss from the input optical fiber 104 to the input signal waveguide 110 and/or the coupling loss from the input signal waveguide 110 to the input signal waveguide 130. In some embodiments, the input signal power detected at the detector 126 may be used to control the power of the pump laser 120 and the amplification in the input signal waveguide 110. For example, a processor, application-specific integrated circuit (ASIC), field-programmable gate array (FPGA) on the PIC die 116, EIC 118, glass interposer 102, etc., may control the power of the pump laser 120 based on the power detected at the detector 126, such as by using a PID or other control loop.

The glass interposer 102 can be any suitable substrate, such as borosilicate glass, fused silica, etc. In some embodiments, a non-glass substrate 102 may be used instead of the glass interposer 102, such as quartz or silicon. In some embodiments, the substrate 102 may be the same component as the PIC die 116.

In the illustrative embodiment, the optical fibers 104, 106 are coupled to the waveguides 110, 112 using a V-groove to support the optical fibers 104, 106. In other embodiments, the optical fibers 104, 106 may be coupled to the waveguides 110, 112 in a different manner, such as using a lens, a mirror, a diffraction grating, and/or the like.

The input signal waveguide 110 may be doped with any suitable dopants. In the illustrative embodiment, the input signal waveguide 110 may be doped with erbium ($Er^{3+}$) for C-band amplification, or the input signal waveguide 110 may be doped with praseodymium ($Pr^{3+}$) for O-band amplification. In other embodiments, the input signal waveguide 110 may be doped with, e.g., neodymium ($Nd^{3+}$), europium ($Eu^{3+}$), ytterbium ($Yb^{3+}$), thulium ($Tm^{3+}$), or Dysprosium ($Dy^{3+}$).

The laser 120 may be any suitable laser. In the illustrative embodiment, the laser 120 is a diode laser disposed in a cavity of the glass interposer 102. In other embodiments, a different laser type may be used, and/or the laser 120 may be separated from the glass interposer 102. In some embodiments, the laser 120 may be on the PIC die 116, and light from the laser 120 can be coupled from the PIC die 116 to the pump waveguide 114.

In the illustrative embodiment, the light from the laser 120 is coupled to the ions in the signal waveguide 110 by the light in the pump waveguide 114 overlapping with the ions in the signal waveguide 110. In other embodiments, the light from the laser 120 may be coupled to the ions in the signal waveguide 110 in a different manner, such as using a dichroic element to couple light from the pump laser 120 directly into the signal waveguide 110, couple light from the pump laser 120 into a waveguide that surrounds the signal waveguide 110, etc.

In the illustrative embodiment, the pump waveguide 114 is terminated at a termination block 122. The termination block 122 may be, e.g., a black dielectric material, black oxide, or other material to absorb light from the pump laser 120. In some embodiments, the ions in the signal waveguide 112 absorb enough of the light from the pump laser 120 that a termination block 122 is not needed.

The PIC die 116 may be made of any suitable material. In the illustrative embodiment, the PIC die 116 is made of silicon. The PIC die 116 may include one or more lasers or other light sources, detectors, amplitude and/or phase modulators, filters, splitters, amplifiers, etc. In one embodiment, the PIC die 116 may receive electrical signals, such as from the EIC die 118, and generate a corresponding optical signal in an output waveguide 132 to be sent to a remote device. In some embodiments, the PIC die 116 may include the laser 120, the pump waveguide 114, the input signal waveguide 110, and/or the output signal waveguide 112. In the illustrative embodiment, the signal waveguides 130, 132 of the PIC die 116 are coplanar with the signal waveguides 110, 112 of the glass interposer 102. In other embodiments, the signal waveguides 130, 132 of the PIC die 116 may not be coplanar with the signal waveguides 110, 112 of the glass interposer 102. For example, the PIC die 116 may be mounted on a surface of the glass interposer 102, and light may be coupled from the signal waveguides 110, 112 of the glass interposer 102 to the signal waveguides 130, 132 of the PIC die 116 using, e.g., tapered waveguides, gratings, lenses, mirrors, evanescent coupling, and/or the like.

The EIC die 118 may be embodied as any suitable electrical integrated circuit. The EIC die 118 may be embodied as, form a part of, or include a processor, a system-on-a-chip (SoC), a memory, an ASIC, an FPGA, and/or the like. In some embodiments, the EIC die 118 may receive, process, and/or send packets using signals sent to and from the PIC die 116.

Figure 4:
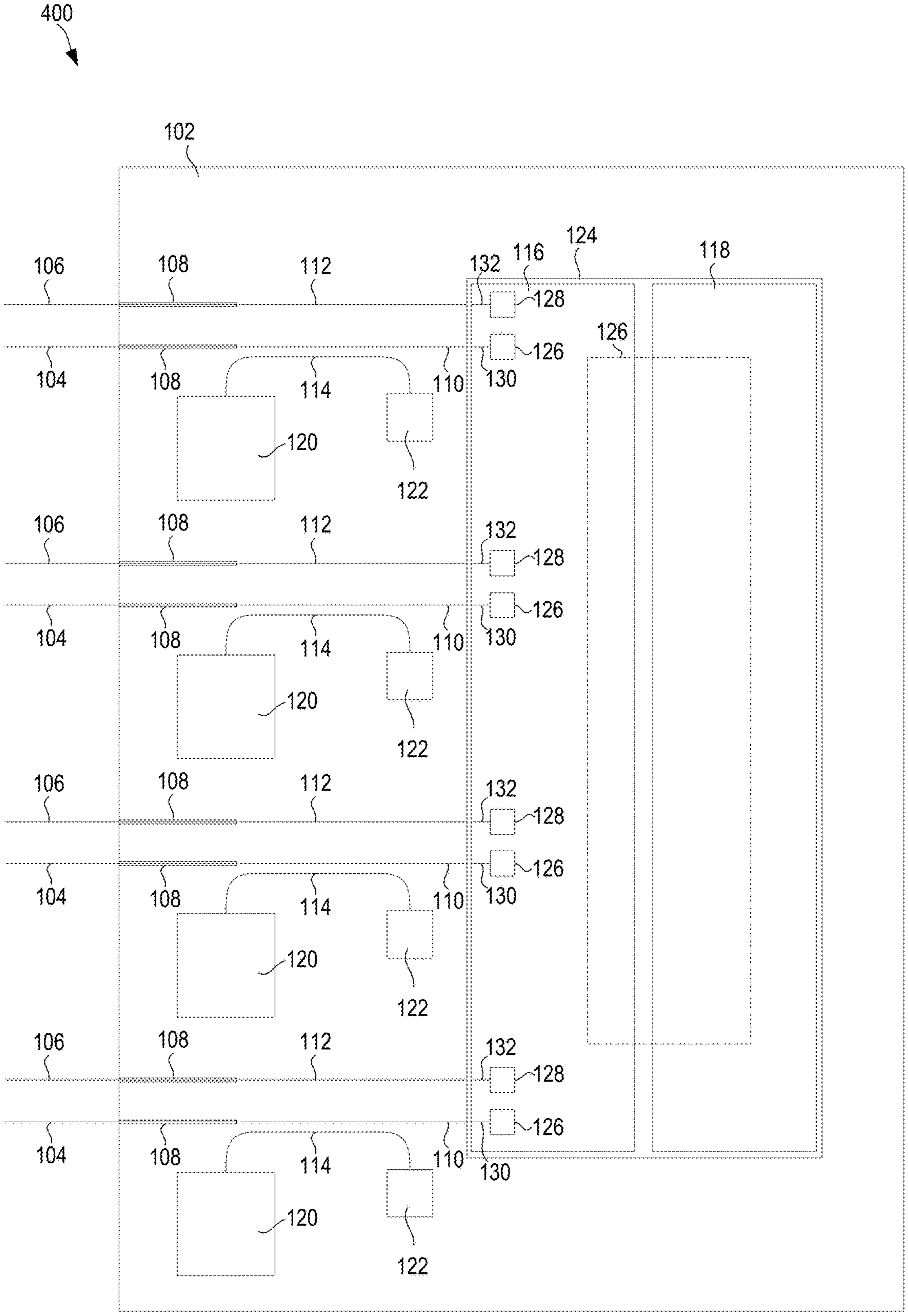
FIG. 4 is a top-down view of one embodiment of a system with a glass interposer with several active waveguides.

Referring now to FIG. 4, in one embodiment, a system 400 includes several input and output channels. The system 400 includes several input fibers 104, input signal waveguides 110, pump waveguides, pumps 120, etc. The various components of the system 400 (and systems 500, 600, 700 described below), such as the glass interposer 102, PIC die 116, waveguides 112, 110, 114, etc., may be similar to or the same as the corresponding component of the system 100, a description of which will not be repeated in the interest of clarity. The system 400 may include any suitable number of input and/or output channels, such as 2-1,024.

Figure 5:
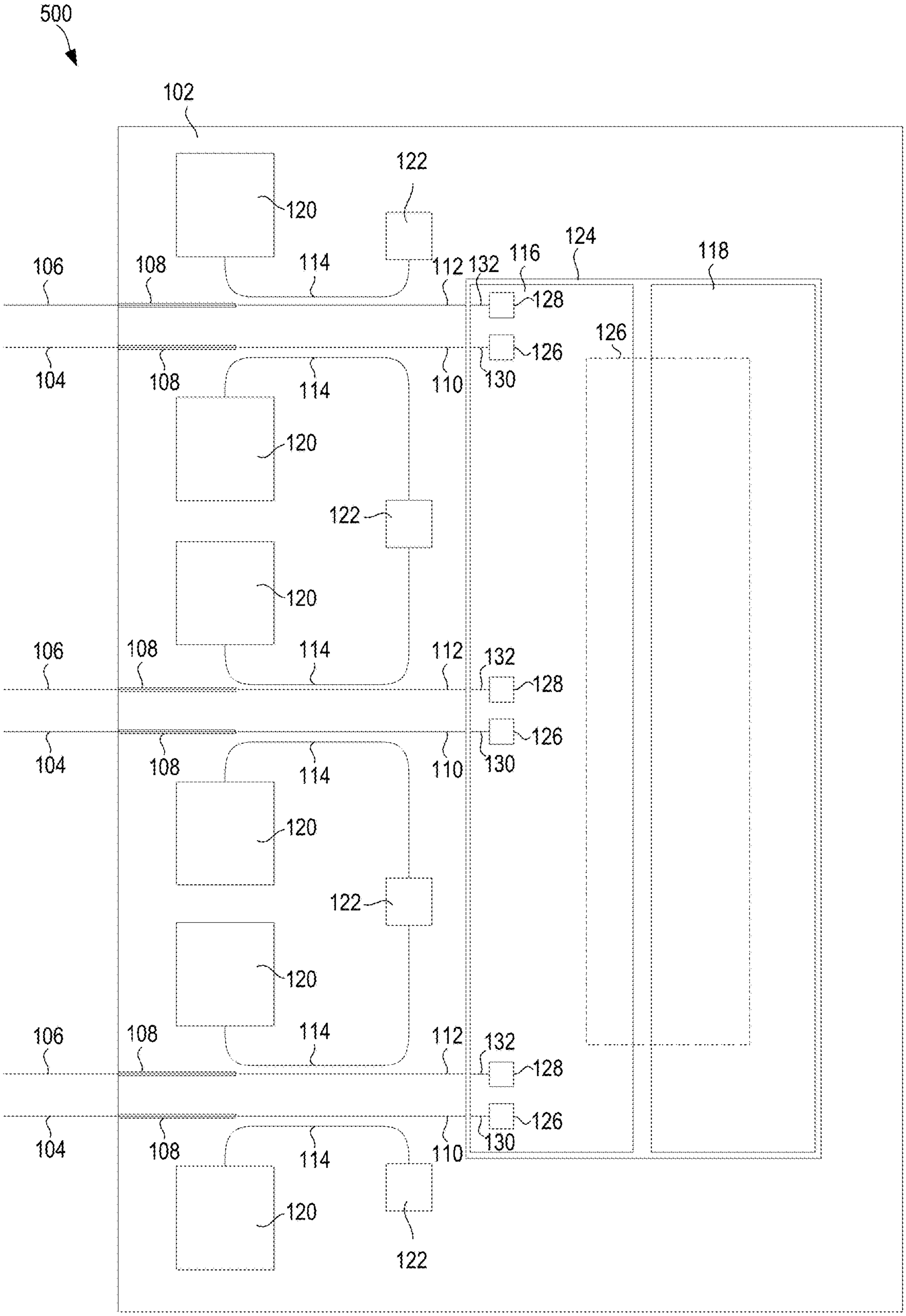
FIG. 5 is a top-down view of one embodiment of a system with a glass interposer with several active input and output waveguides.

Referring now to FIG. 5, in one embodiment, a system 500 includes a pump waveguide 114 next to each input signal waveguide 110 and each output signal waveguide 112. In the system 500, each output signal waveguide 112 may be doped in a similar manner as the input signal waveguides 110, allowing for amplification of output signals of the PIC die 116 as well as amplification of input signals of the PIC die 116. In some embodiments, the amplification of the output signal in the output signal waveguides 112 may depend on the coupling loss from the PIC die 116 to the output fiber 1106, which may be detected using, e.g., a low-coupling splitter or from feedback from a remote component that detects the output signal. In some cases, a pump waveguide 114 for an input waveguide 110 may be terminated at the same termination block 122 as a pump waveguide 114 for an output waveguide 112.

Figure 6:
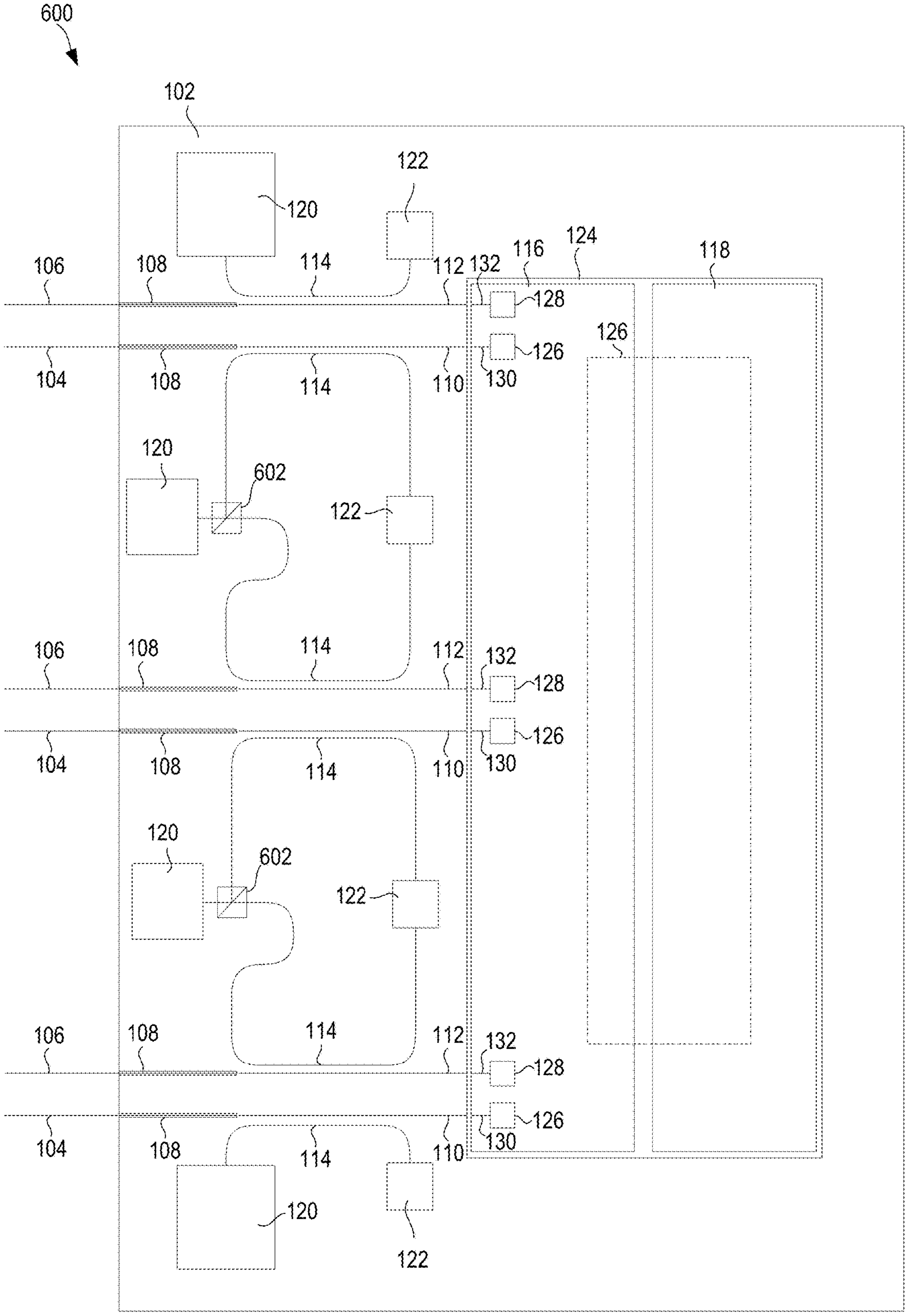
FIG. 6 is a top-down view of one embodiment of a system with a glass interposer with a pump driving two or more active waveguides.

Referring now to FIG. 6, in one embodiment, a system 600 includes a beam splitter 602 to split an output of the laser 120 into two pump waveguides 114, allowing one laser 120 to be used to amplify two signals. In the illustrative embodiment, a bulk beam splitter 602 may be positioned in a cavity in the glass interposer, and output modes of the beam splitter 602 may be coupled into the pump waveguides 114 using, e.g., a lens or a mirror. In other embodiments, a different kind of beam splitter may be used, such as evanescent coupling between two pump waveguides 114.

Figure 7:
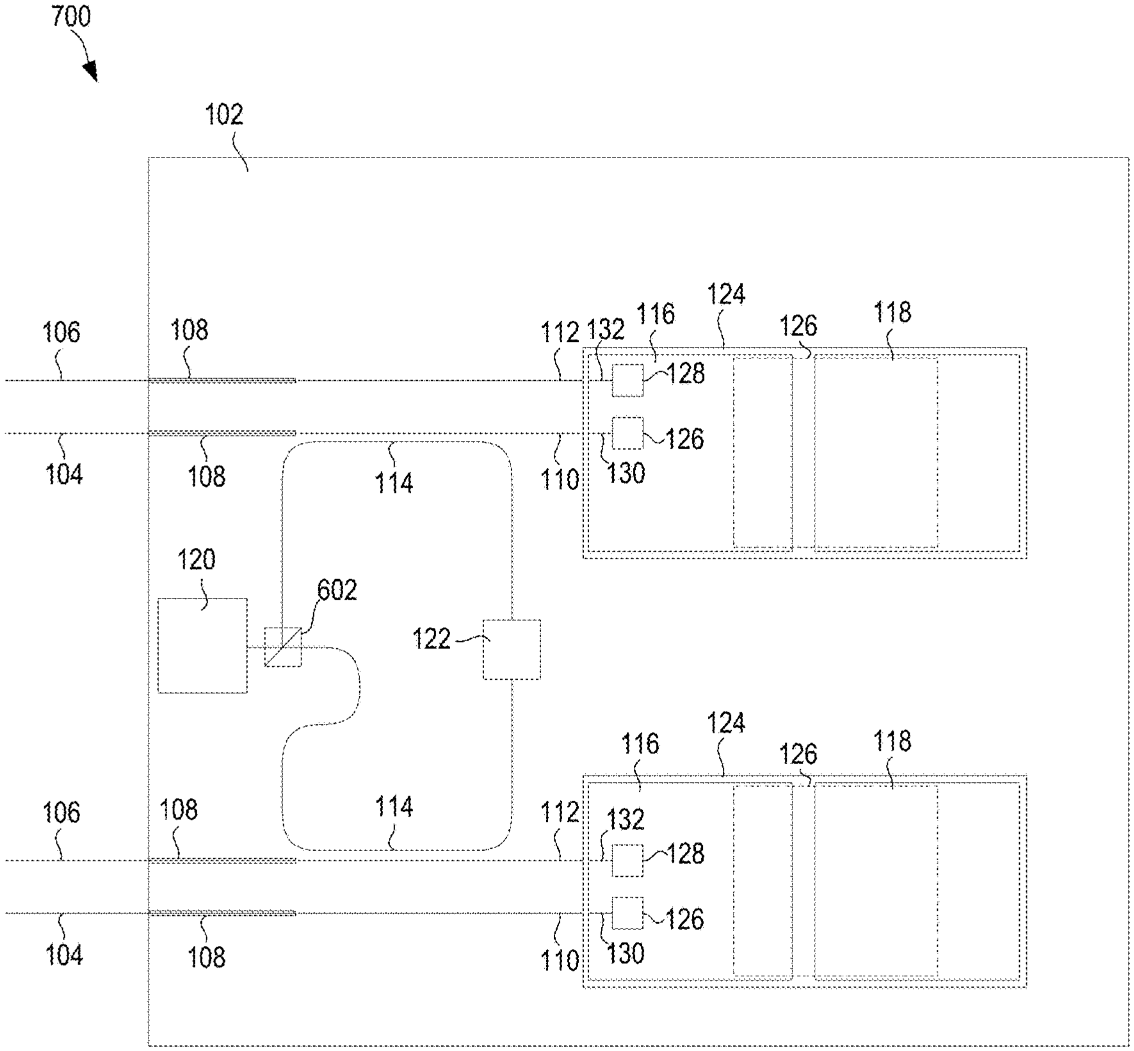
FIG. 7 is a top-down view of one embodiment of a system with a glass interposer with active waveguides leading to two or more photonic integrated circuits.

Referring now to FIG. 7, in one embodiment, a system 700 may include more than one PIC die 116 positioned in cavities in the glass interposer 102. The system 700 may include any suitable number of PIC dies 116, such as 2-100 PIC dies 116.

It should be appreciated that the various features of the embodiments described above may be combined. For example, in one embodiment, a glass interposer 102 may support several PIC dies 116, each of which has several inputs and outputs, where each of the inputs and outputs is amplified in the glass interposer.

Figure 8:
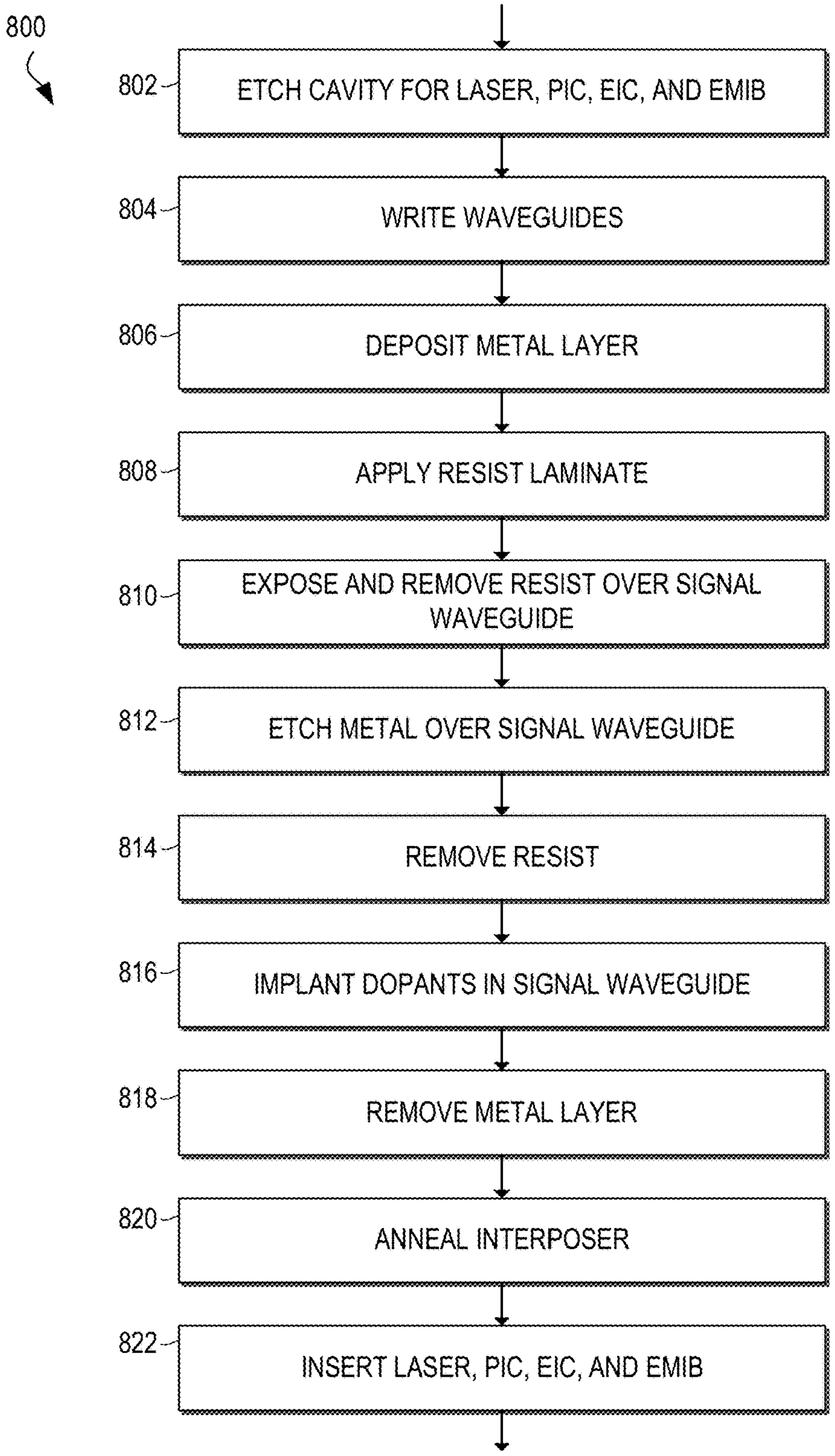
FIG. 8 is a simplified flow diagram of at least one embodiment of a method for manufacturing a system with a glass interposer with an active waveguide.

Referring now to FIG. 8, in one embodiment, a flowchart for a method 800 for creating the system 100 is shown. The method 800 may be executed by a technician and/or by one or more automated machines. In some embodiments, one or more machines may be programmed to do some or all of the steps of the method 800. Such a machine may include, e.g., a memory, a processor, data storage, etc. The memory and/or data storage may store instructions that, when executed by the machine, causes the machine to perform some or all of the steps of the method 800. The method 800 may use any suitable set of techniques that are used in semiconductor processing, such as chemical vapor deposition, atomic layer deposition, physical layer deposition, molecular beam epitaxy, layer transfer, photolithography, ion implantation, dry etching, wet etching, thermal treatments, flip chip, layer transfer, magnetron sputter deposition, pulsed laser deposition, etc. It should be appreciated that the method 800 is merely one embodiment of a method to create the system 100, and other methods may be used to create the system 100. In some embodiments, steps of the method 800 may be performed in a different order than that shown in the flowchart.

Figure 9:
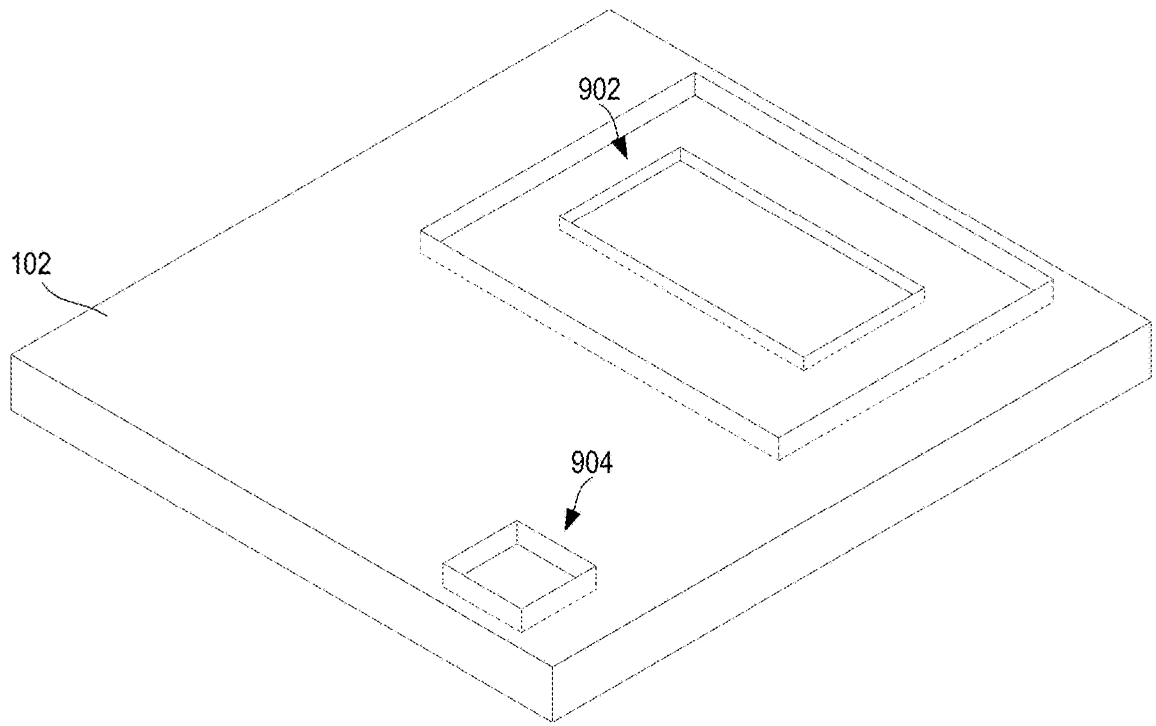
FIG. 9 shows one embodiment of one stage of manufacture of a glass interposer with an active waveguide.

The method 800 beings in block 802, in which one or more cavities 902, 904 are etched into a glass interposer 102, such as for the laser 120, PIC die 116, EIC die 118, and EMIB 134. The etched glass interposer 102 is shown in FIG. 9.

Figure 10:
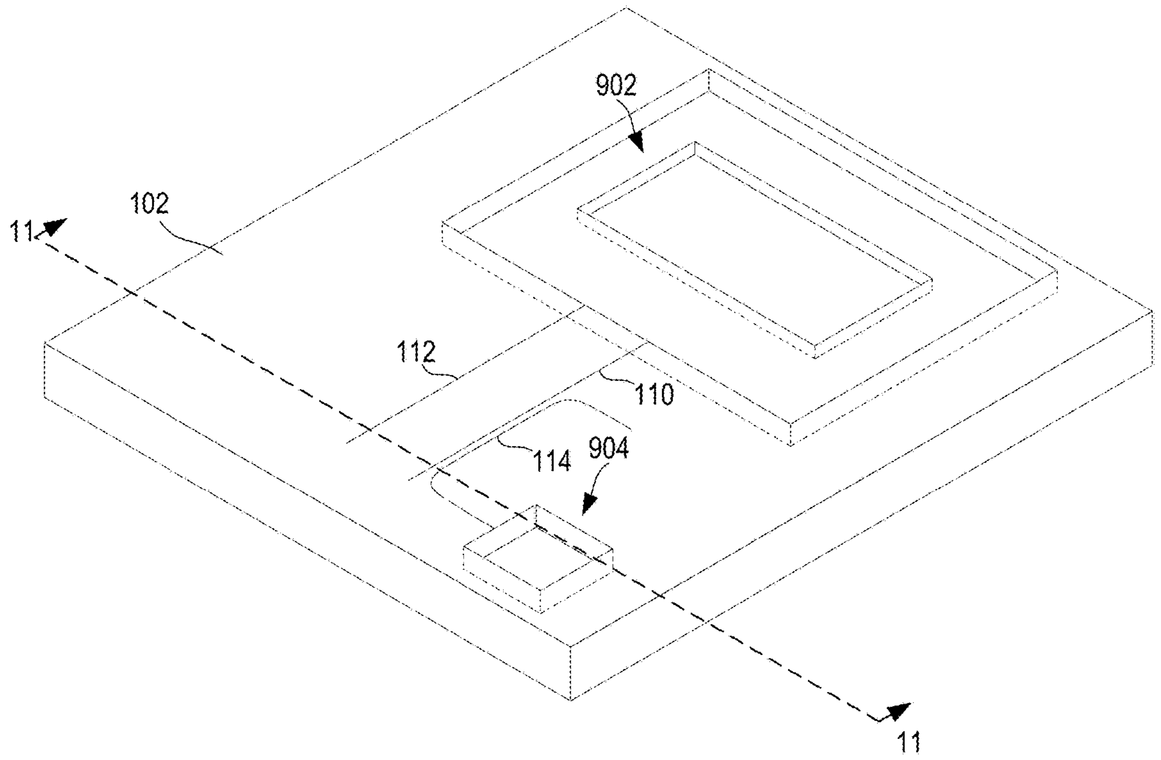
FIG. 10 shows one embodiment of one stage of manufacture of a glass interposer with an active waveguide.
Figure 11:
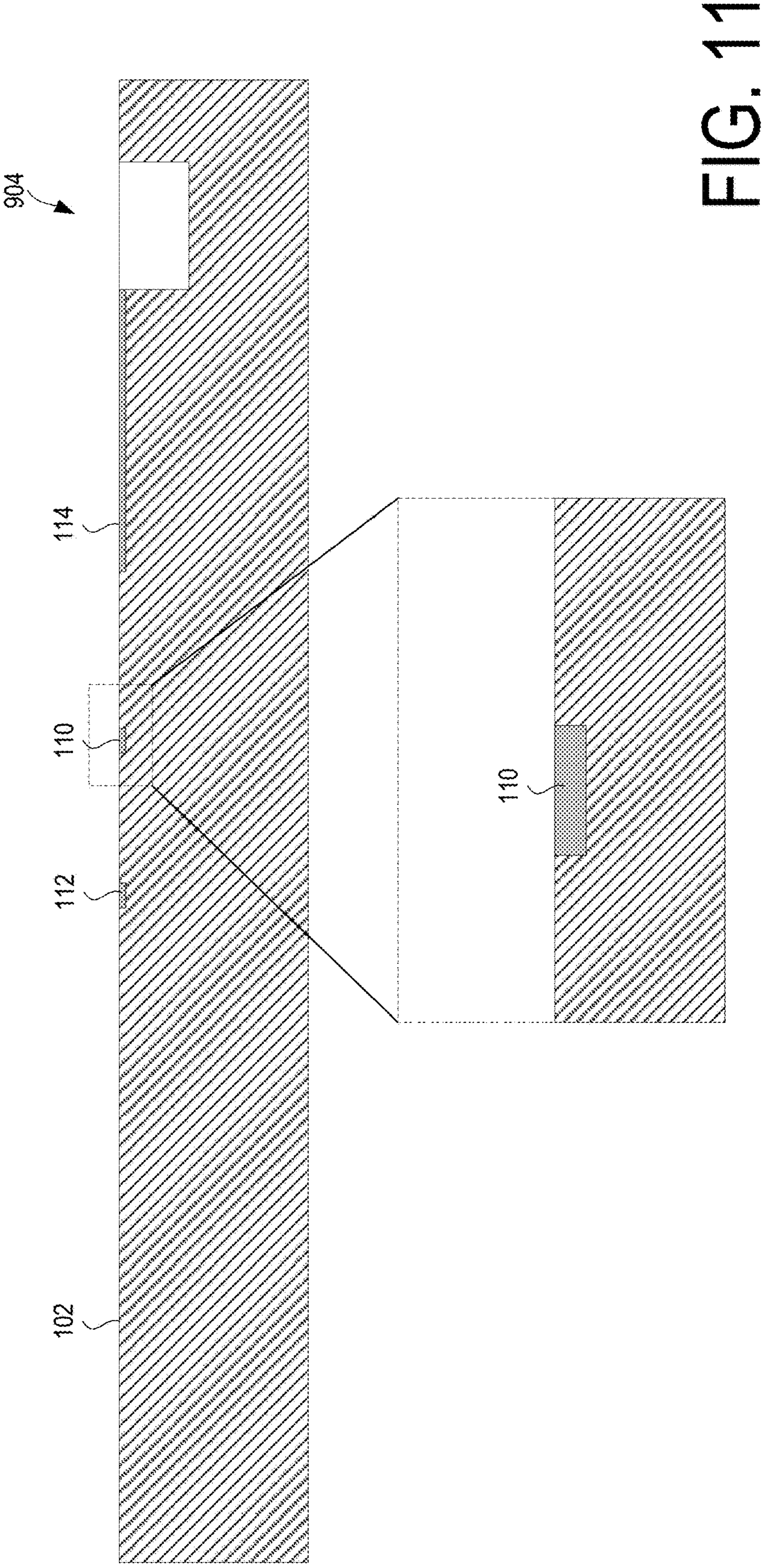
FIG. 11 shows one embodiment of one stage of manufacture of a glass interposer with an active waveguide.

In block 804, the waveguides 110, 112, 114 are written on the glass interposer 102, as shown in FIGS. 10 and 11. In the illustrative embodiment, the waveguides 110, 112, 114 are written using laser direct writing. In other embodiments, the waveguides 110, 112, 114 may be created in a different manner.

Figure 12:
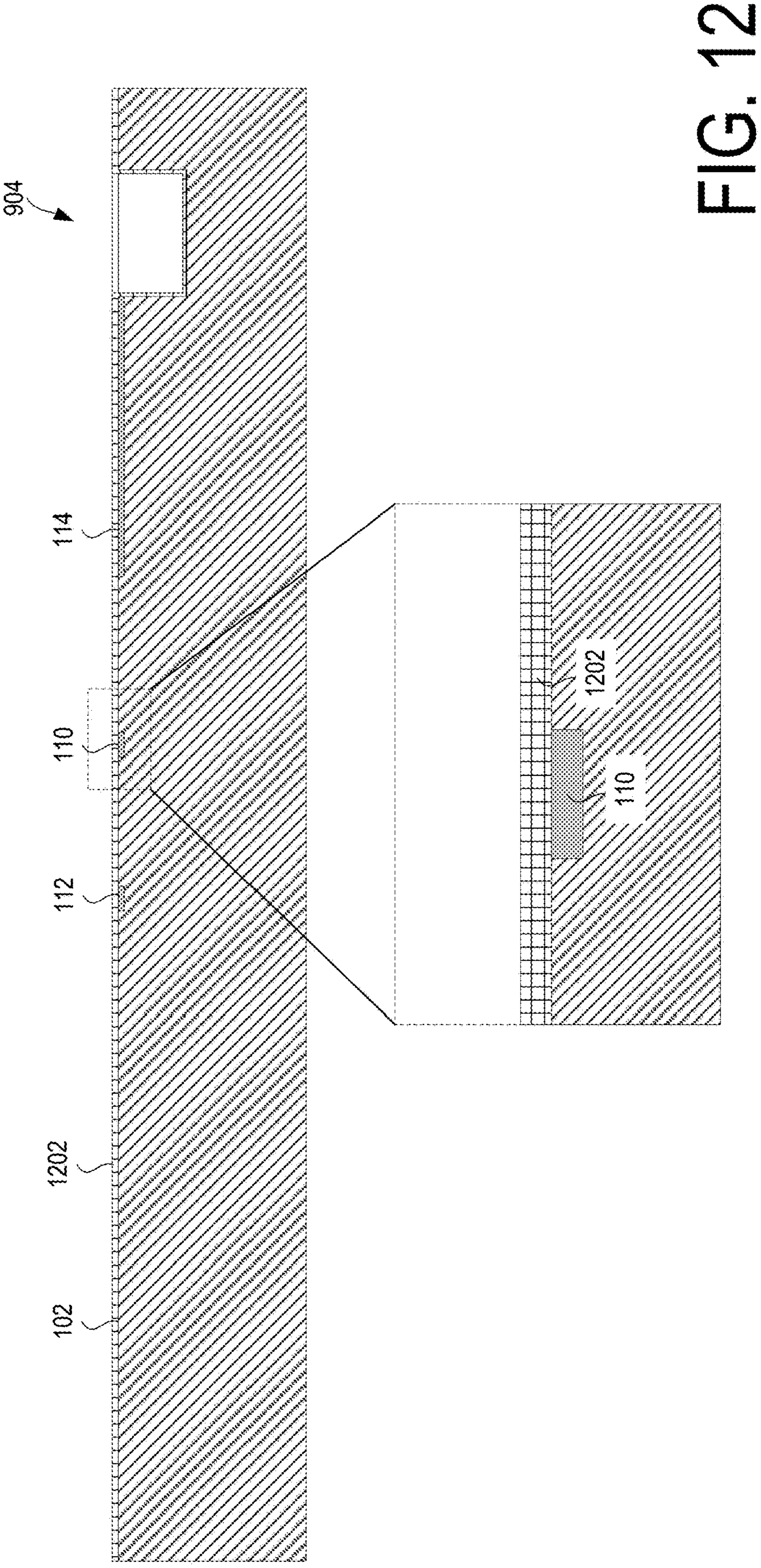
FIG. 12 shows one embodiment of one stage of manufacture of a glass interposer with an active waveguide.

In block 806, a metal layer 1202 is deposited on the glass interposer 102, as shown in FIG. 12. In the illustrative embodiment, a thin layer of titanium is first deposited. In the illustrative embodiment, the thin layer of titanium is, e.g., 50 nanometers thick. In other embodiments, titanium layer may be, e.g., 20-200 nanometers thick. A copper layer is then deposited on the titanium. In the illustrative embodiment, the copper layer is, e.g., 250-500 nanometers thick. In other embodiments, the copper layer may be, e.g., 100 nanometers to 2 microns thick. In the illustrative embodiment, the copper layer protects the titanium layer from oxidation, and the titanium layer improves adhesion to the glass interposer 102 compared to only copper. In other embodiments, a different layer or combinations of layers may be used.

Figure 13:
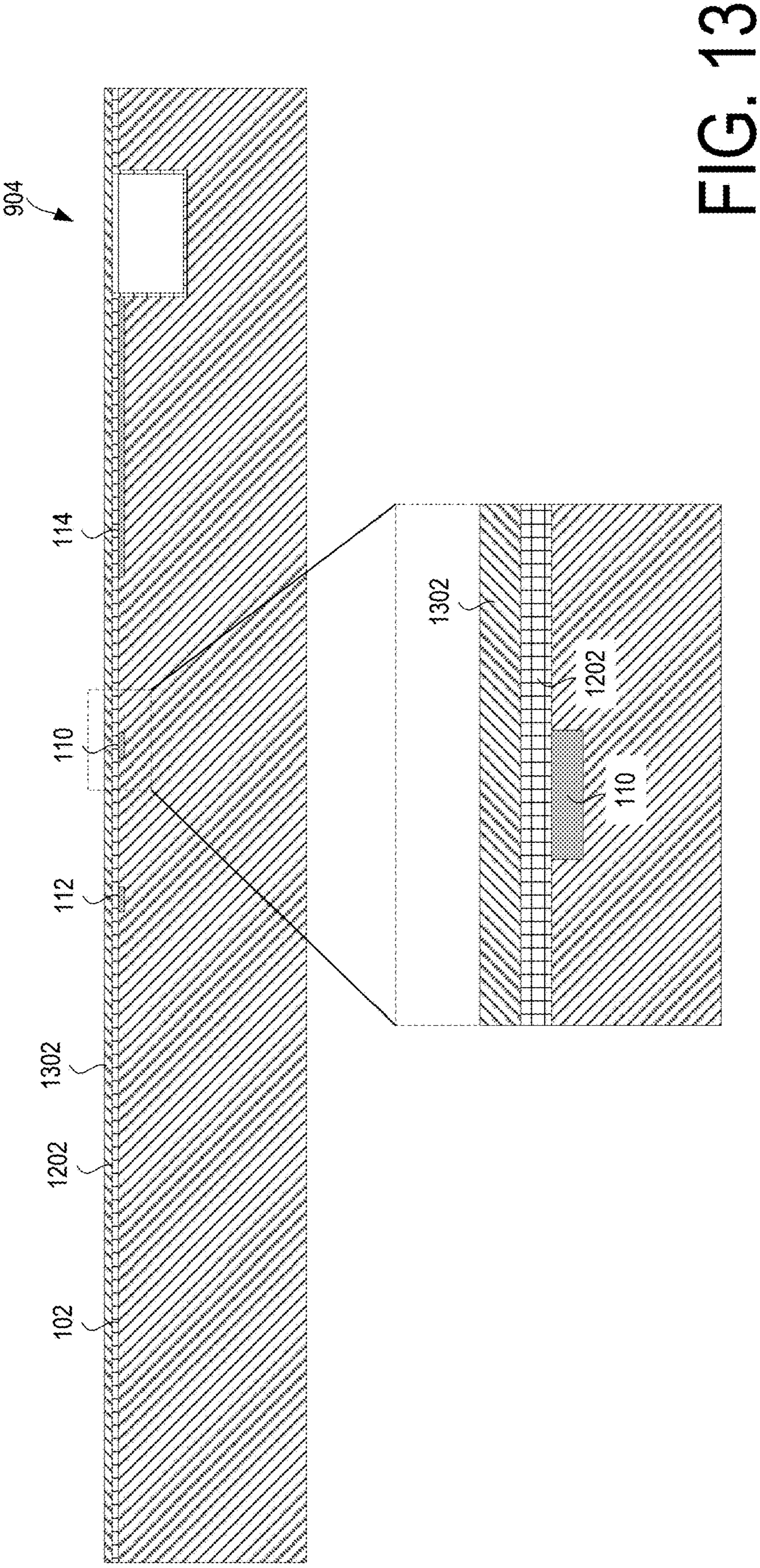
FIG. 13 shows one embodiment of one stage of manufacture of a glass interposer with an active waveguide.

In block 808, a resist laminate 1302 is applied over the metal layer 1202, as shown in FIG. 13. In other embodiments, a resist layer 1302 may be applied using, e.g., spin coating. The resist laminate 1302 may be a negative or positive photoresist.

Figure 14:
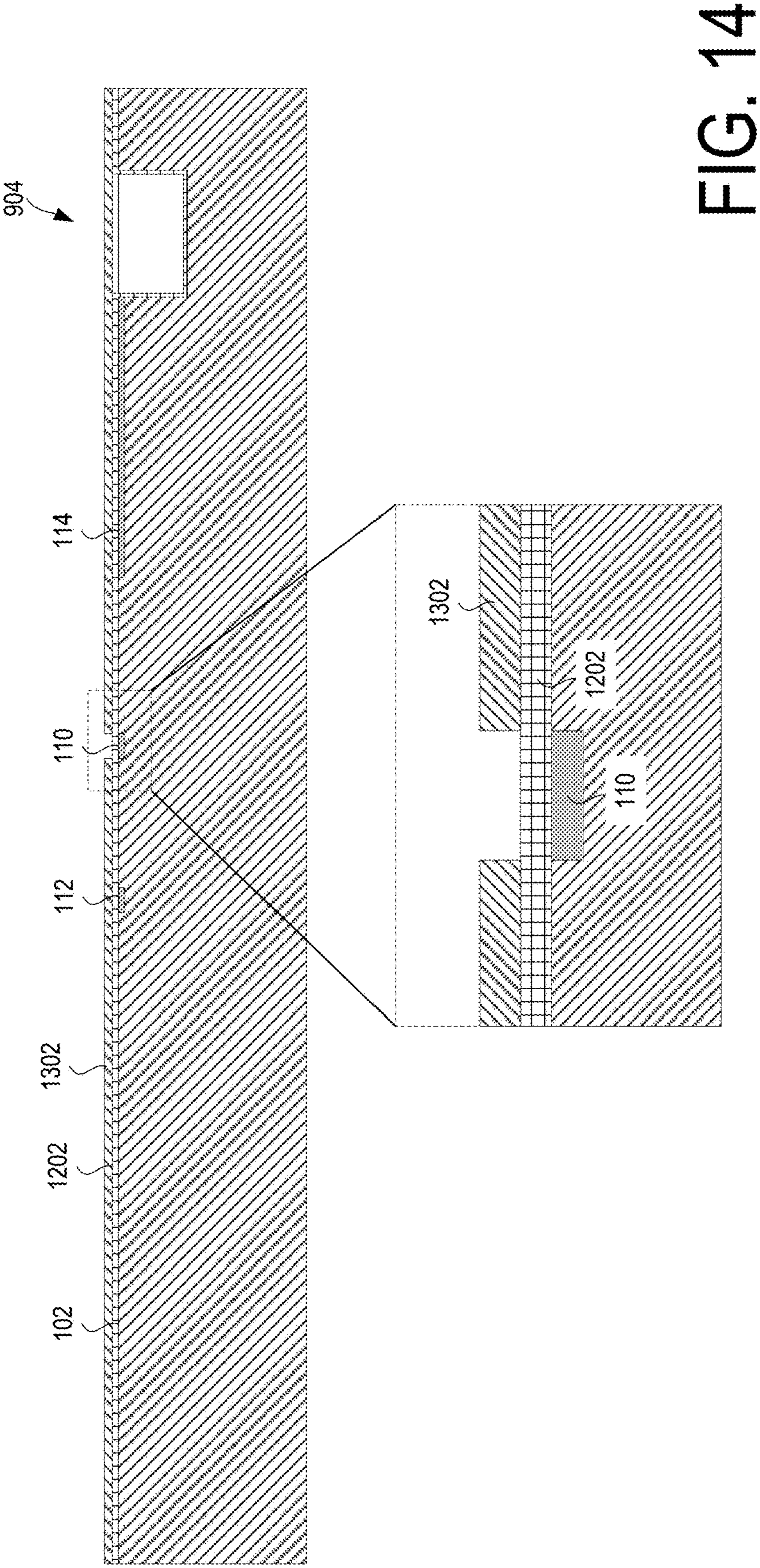
FIG. 14 shows one embodiment of one stage of manufacture of a glass interposer with an active waveguide.

In block 810, the resist laminate 1302 is exposed, and the resist over the input signal waveguide 110 is removed, as shown in FIG. 14. In other embodiments, such as embodiments in which the output waveguide 112 is to amplify the output signal, the resist over the output waveguide 112 may be removed.

Figure 15:
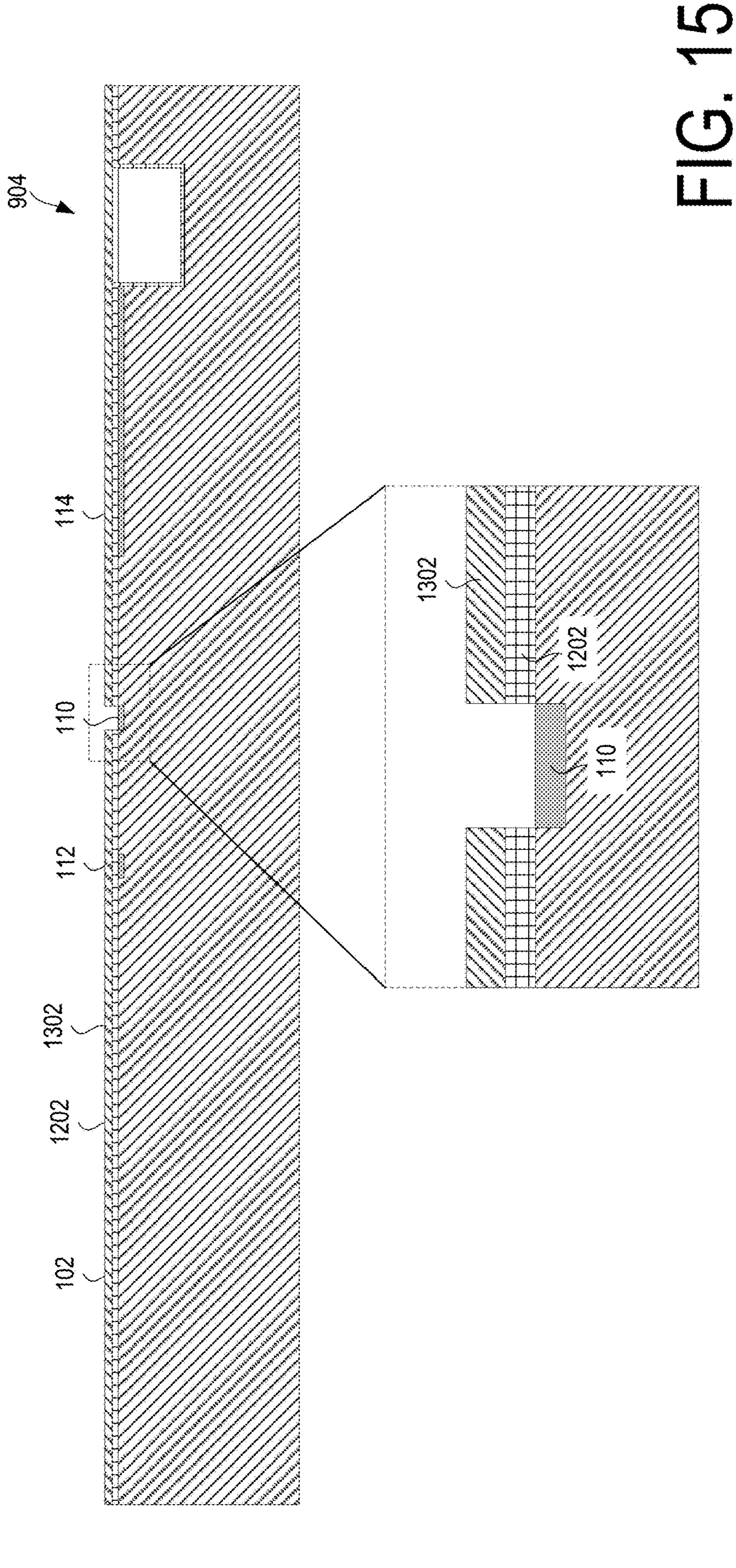
FIG. 15 shows one embodiment of one stage of manufacture of a glass interposer with an active waveguide.
Figure 16:
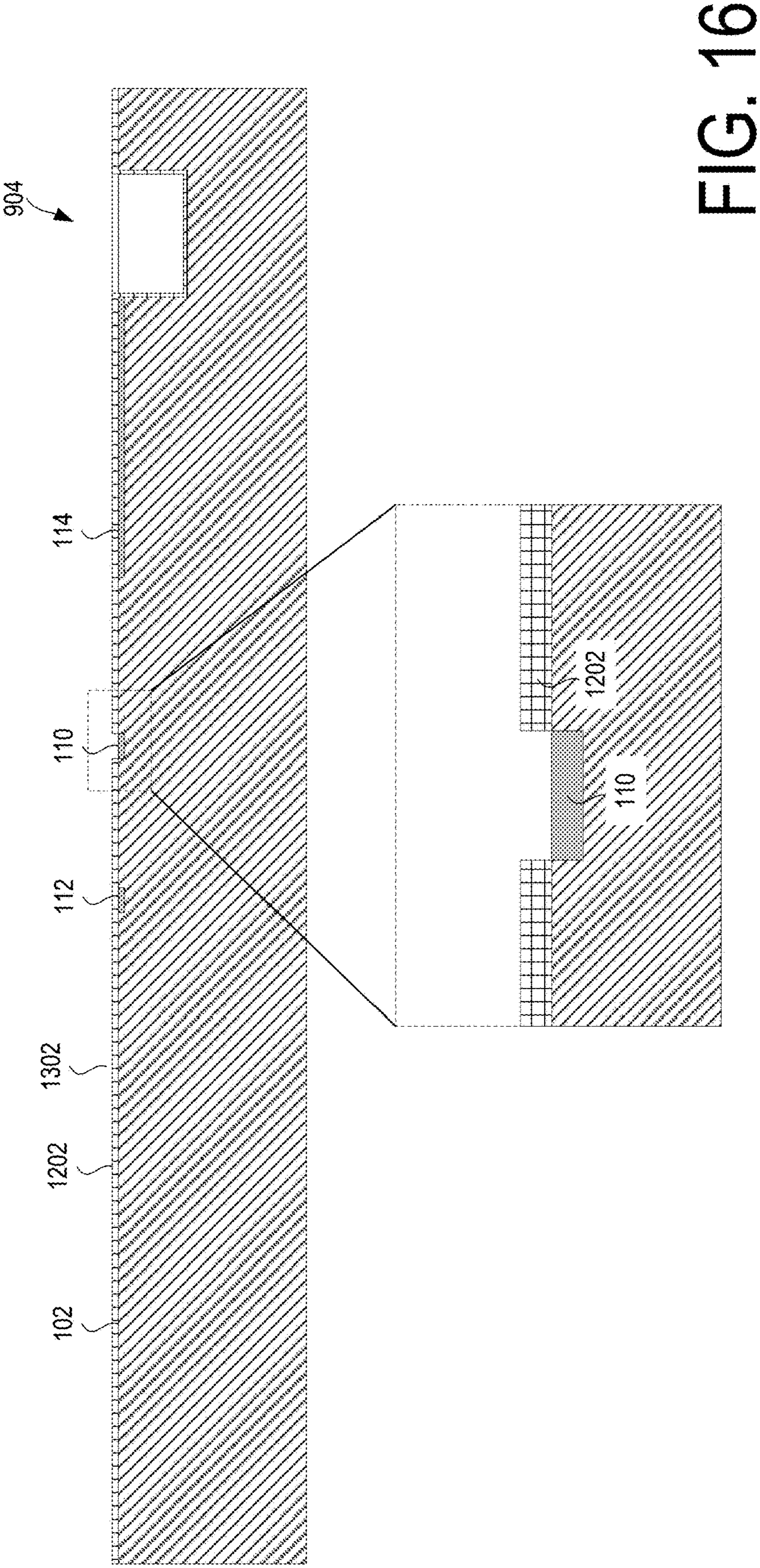
FIG. 16 shows one embodiment of one stage of manufacture of a glass interposer with an active waveguide.

In block 812, the metal over the input signal waveguide 110 is etched away, as shown in FIG. 15. The resist laminate 1302 prevents the metal covered by the resist laminate 1302 from being removed. In other embodiments, such as embodiments in which the output waveguide 112 is to amplify the output signal, the metal layer over the output waveguide 112 may be removed. In block 814, the resist laminate 1302 is removed, leaving the metal layer 1202 with the waveguide 110 exposed, as shown in FIG. 16.

Figure 17:
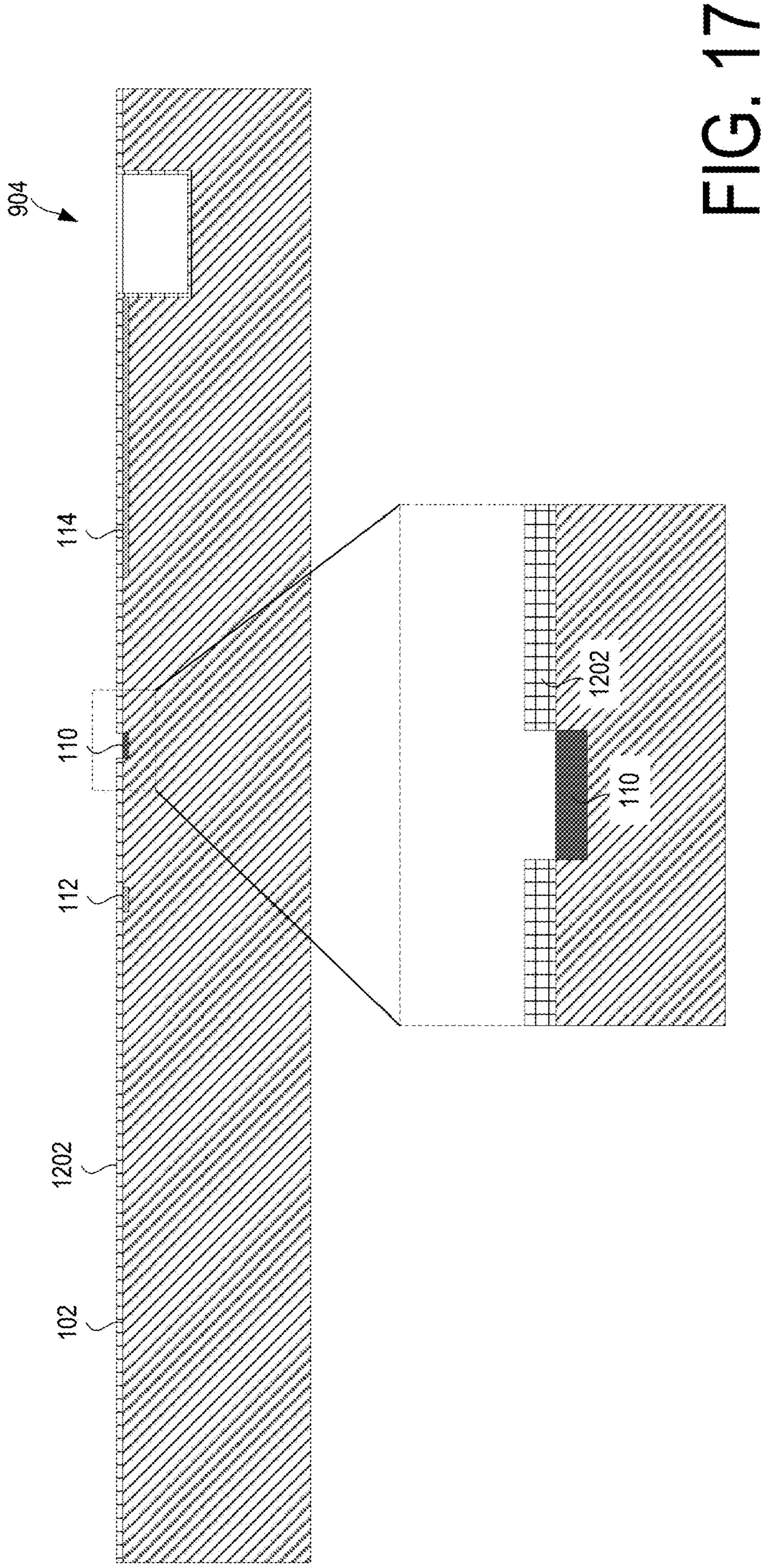
FIG. 17 shows one embodiment of one stage of manufacture of a glass interposer with an active waveguide.
Figure 18:
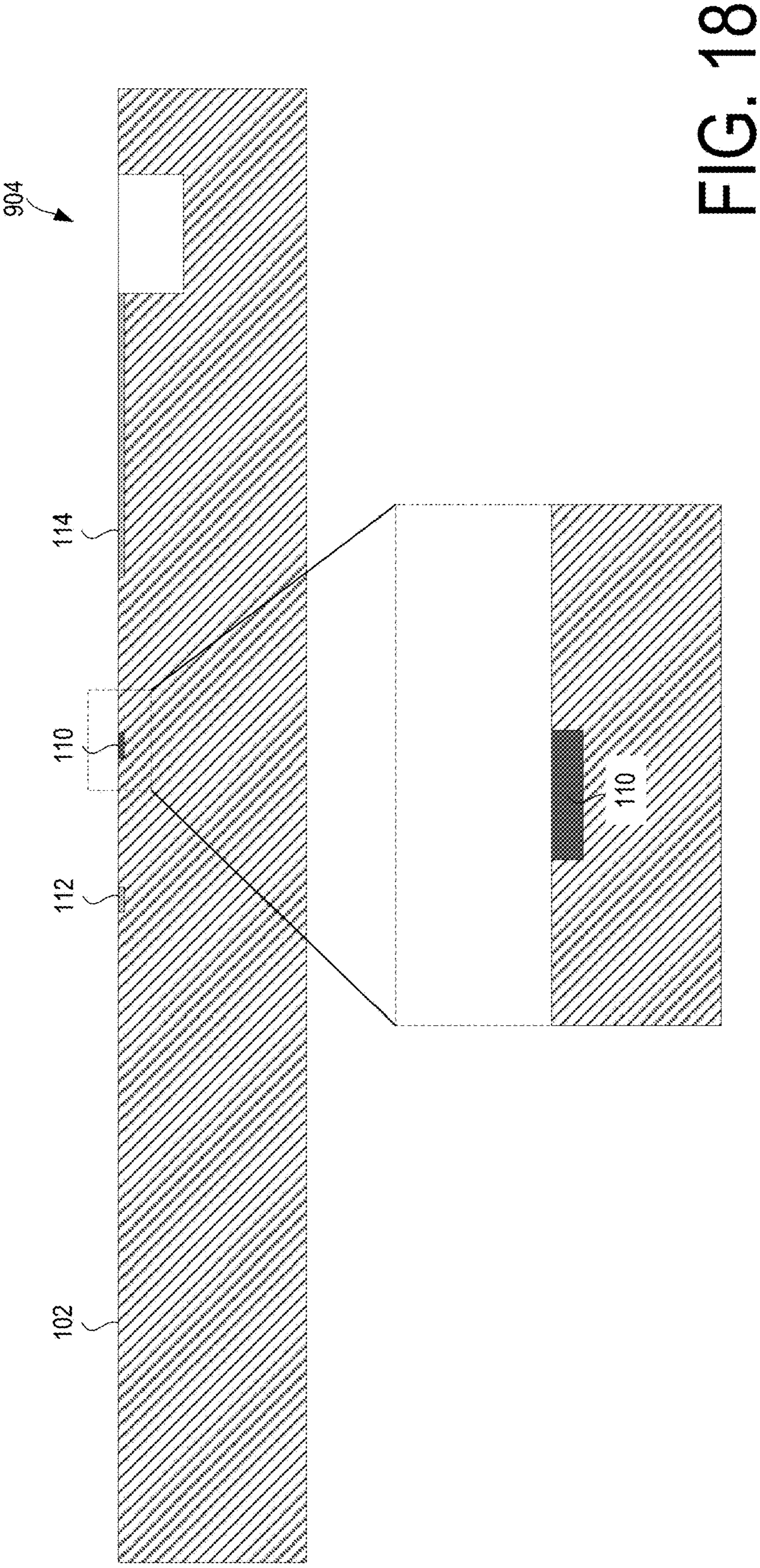
FIG. 18 shows one embodiment of one stage of manufacture of a glass interposer with an active waveguide.

In block 816, dopants are implanted in the signal waveguide 110, as shown in FIG. 17. In the illustrative embodiment, focused ion beam (FIB) implantation is used to implant the ions in the waveguide 110. A liquid metal ion source (LMIS) or liquid alloy ion source (LAIS) may be used as a source of ions. In other embodiments, other ion implantation techniques may be used, such as field-assisted solid-state ion exchange (FASSIE). After ion implantation, the metal layer 1202 is removed, as shown in FIG. 18.

In block 820, the glass interposer 102 is annealed to heal defects caused by the ion implantation process. The glass interposer 102 may be annealed at, e.g., 100-1,500° C., depending on the type of ions and glass/semiconductor used. In some embodiments, low-temperature annealing with a longer dwell time may be used, or multi-step annealing with high-temperature annealing and short dwell time may be used. In embodiments with a high annealing temperature, the glass interposer 102 may be made from fused silica in order to avoid glass softening of the glass interposer 102.

In block 822, the laser 120, the PIC die 116, the EIC die 118, and the EMIB 134 may be positioned in the cavities of the glass interposer 102. The optical fibers 104, 106 can be placed in V-grooves 108 formed in the glass interposer 102, resulting in the system 100, as shown in FIG. 1.

Figure 19:
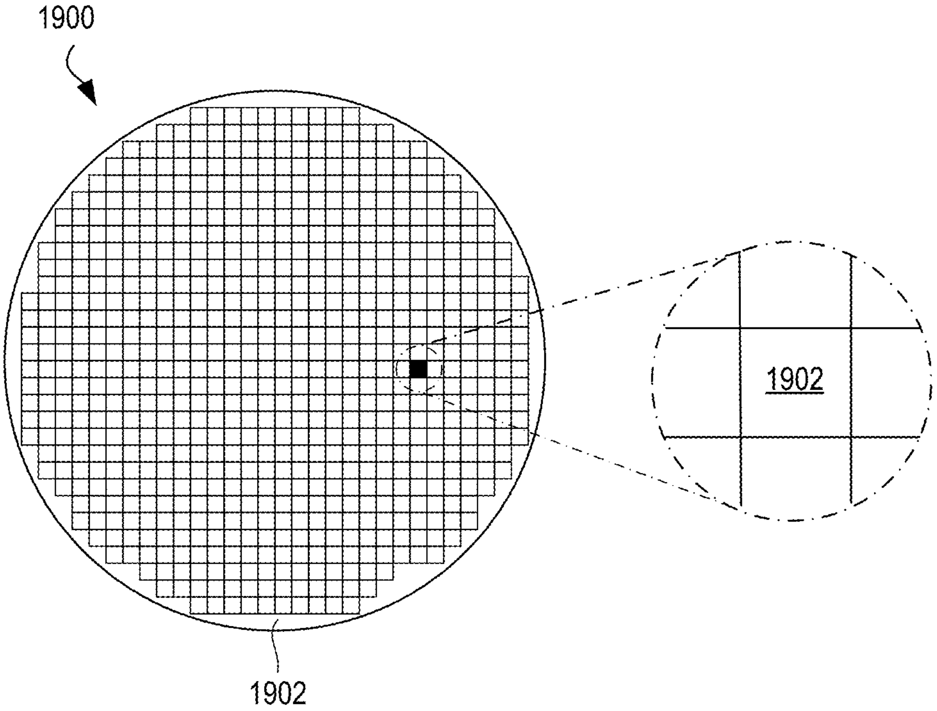
FIG. 19 is a top view of a wafer and dies that may be included in a microelectronic assembly, in accordance with any of the embodiments disclosed herein.

FIG. 19 is a top view of a wafer 1900 and dies 1902 that may be included in any of the systems 100, 400, 500, 600, 700 disclosed herein (e.g., as any suitable ones of the PIC dies 116 or EIC dies 118). The wafer 1900 may be composed of semiconductor material and may include one or more dies 1902 having integrated circuit structures formed on a surface of the wafer 1900. The individual dies 1902 may be a repeating unit of an integrated circuit product that includes any suitable integrated circuit. After the fabrication of the semiconductor product is complete, the wafer 1900 may undergo a singulation process in which the dies 1902 are separated from one another to provide discrete "chips" of the integrated circuit product. The die 1902 may be any of the PIC dies 116 or EIC dies 118 disclosed herein. The die 1902 may include one or more transistors (e.g., some of the transistors 2040 of FIG. 20, discussed below), supporting circuitry to route electrical signals to the transistors, passive components (e.g., signal traces, resistors, capacitors, or inductors), and/or any other integrated circuit components. In some embodiments, the wafer 1900 or the die 1902 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 1902. For example, a memory array formed by multiple memory devices may be formed on a same die 1902 as a processor unit (e.g., the processor unit 2302 of FIG. 23) or other logic that is configured to store information in the memory devices or execute instructions stored in the memory array. Various ones of the dies 116, 118 disclosed herein may be manufactured using a die-to-wafer assembly technique in which some dies 116, 118 are attached to a wafer 1900 that include others of the dies 116, 118, and the wafer 1900 is subsequently singulated.

Figure 20:
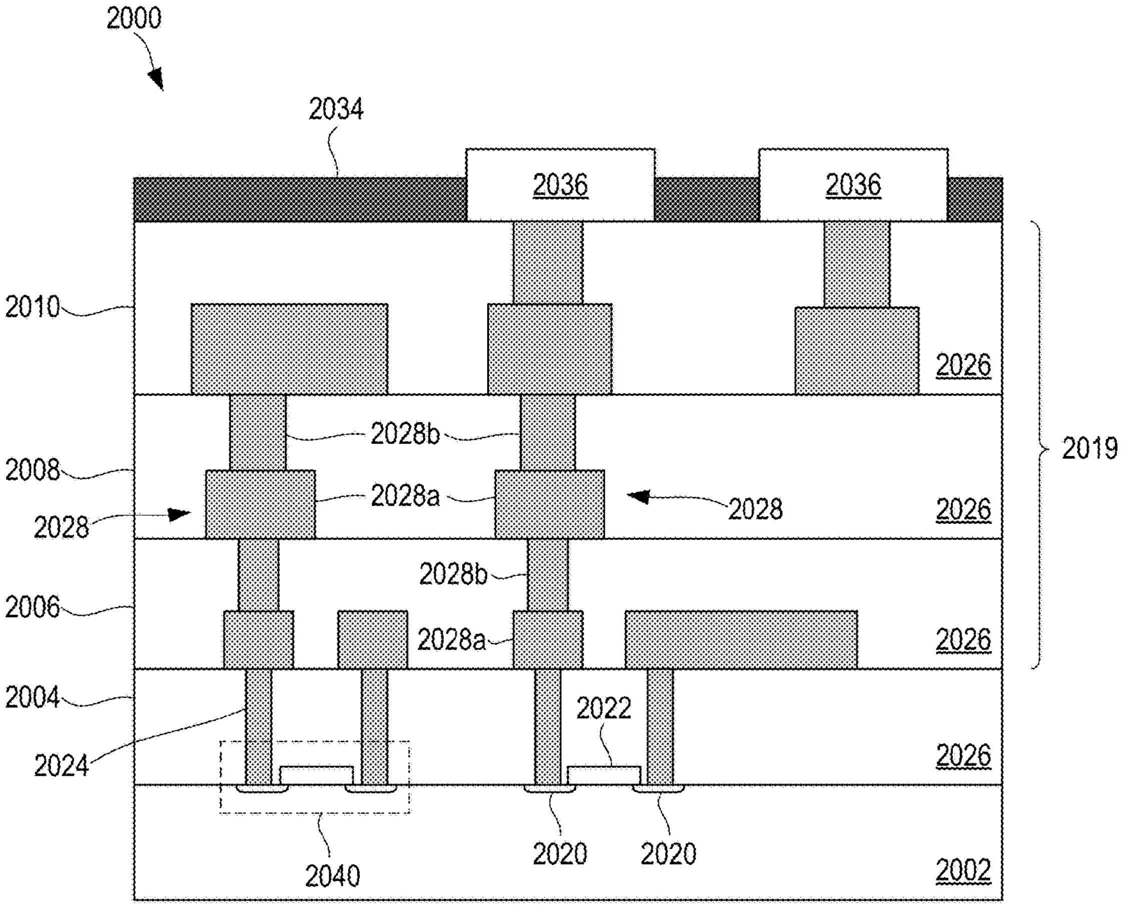
FIG. 20 is a cross-sectional side view of an integrated circuit device that may be included in a microelectronic assembly, in accordance with any of the embodiments disclosed herein.

FIG. 20 is a cross-sectional side view of an integrated circuit device 2000 that may be included in any of the systems 100, 400, 500, 600, 700 disclosed herein (e.g., in any of the dies 116, 118). One or more of the integrated circuit devices 2000 may be included in one or more dies 1902 (FIG. 19). The integrated circuit device 2000 may be formed on a die substrate 2002 (e.g., the wafer 1900 of FIG. 19) and may be included in a die (e.g., the die 1902 of FIG. 19). The die substrate 2002 may be a semiconductor substrate composed of semiconductor material systems including, for example, n-type or p-type materials systems (or a combination of both). The die substrate 2002 may include, for example, a crystalline substrate formed using a bulk silicon or a silicon-on-insulator (SOI) substructure. In some embodiments, the die substrate 2002 may be formed using alternative materials, which may or may not be combined with silicon, that include, but are not limited to, germanium, indium antimonide, lead telluride, indium arsenide, indium phosphide, gallium arsenide, or gallium antimonide. Further materials classified as group II-VI, III-V, or IV may also be used to form the die substrate 2002. Although a few examples of materials from which the die substrate 2002 may be formed are described here, any material that may serve as a foundation for an integrated circuit device 2000 may be used. The die substrate 2002 may be part of a singulated die (e.g., the dies 1902 of FIG. 19) or a wafer (e.g., the wafer 1900 of FIG. 19).

The integrated circuit device 2000 may include one or more device layers 2004 disposed on the die substrate 2002. The device layer 2004 may include features of one or more transistors 2040 (e.g., metal oxide semiconductor field-effect transistors (MOSFETs)) formed on the die substrate 2002. The transistors 2040 may include, for example, one or more source and/or drain (S/D) regions 2020, a gate 2022 to control current flow between the S/D regions 2020, and one or more S/D contacts 2024 to route electrical signals to/from the S/D regions 2020. The transistors 2040 may include additional features not depicted for the sake of clarity, such as device isolation regions, gate contacts, and the like. The transistors 2040 are not limited to the type and configuration depicted in FIG. 20 and may include a wide variety of other types and configurations such as, for example, planar transistors, non-planar transistors, or a combination of both. Non-planar transistors may include FinFET transistors, such as double-gate transistors or tri-gate transistors, and wrap-around or all-around gate transistors, such as nanoribbon, nanosheet, or nanowire transistors.

FIGS. 21A-21D are simplified perspective views of example planar, FinFET, gate-all-around, and stacked gate-all-around transistors. The transistors illustrated in FIGS. 21A-21D are formed on a substrate 2116 having a surface 2108. Isolation regions 2114 separate the source and drain regions of the transistors from other transistors and from a bulk region 2118 of the substrate 2116.

Figure 21B:
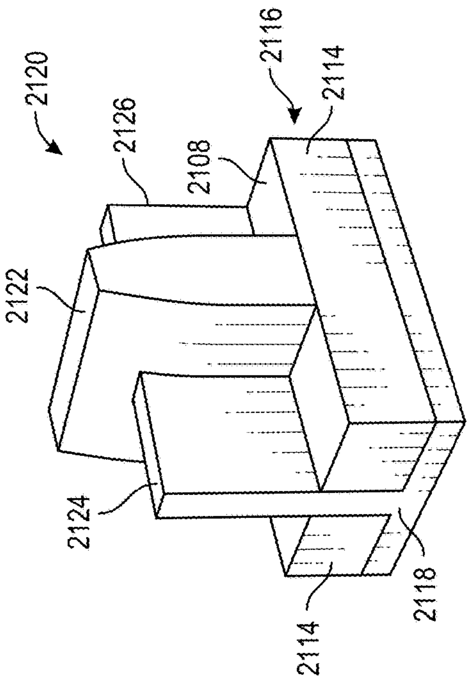
FIGS. 21A-21D are perspective views of example planar, gate-all-around, and stacked gate-all-around transistors.
Figure 21D:
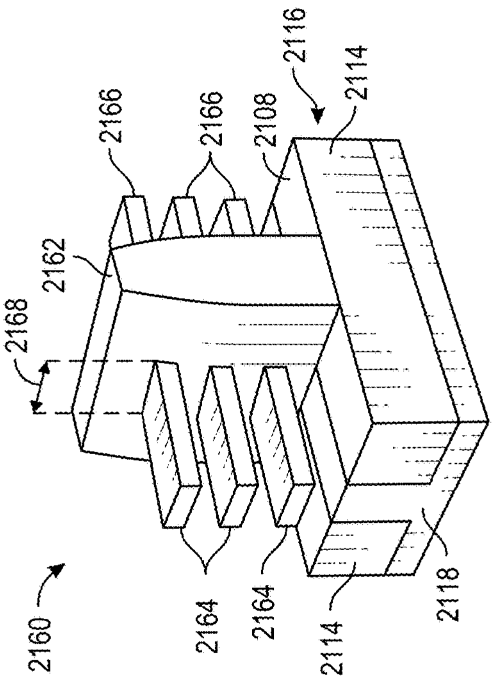
Figure 21A:
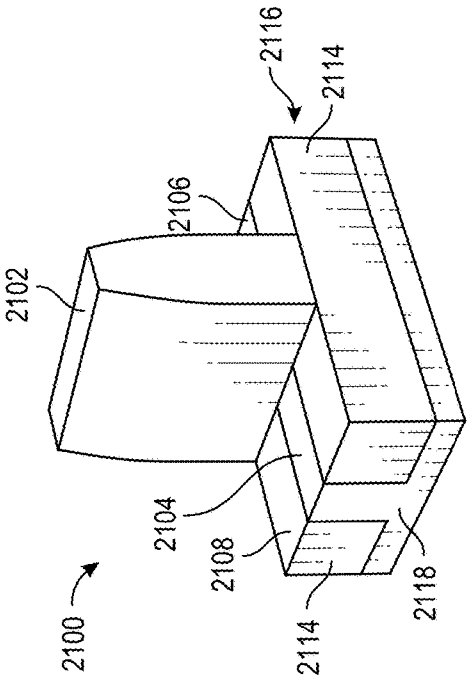

FIG. 21A is a perspective view of an example planar transistor 2100 comprising a gate 2102 that controls current flow between a source region 2104 and a drain region 2106. The transistor 2100 is planar in that the source region 2104 and the drain region 2106 are planar with respect to the substrate surface 2108.

FIG. 21B is a perspective view of an example FinFET transistor 2120 comprising a gate 2122 that controls current flow between a source region 2124 and a drain region 2126. The transistor 2120 is non-planar in that the source region 2124 and the drain region 2126 comprise "fins" that extend upwards from the substrate surface 2128. As the gate 2122 encompasses three sides of the semiconductor fin that extends from the source region 2124 to the drain region 2126, the transistor 2120 can be considered a tri-gate transistor. FIG. 21B illustrates one S/D fin extending through the gate 2122, but multiple S/D fins can extend through the gate of a FinFET transistor.

Figure 21C:
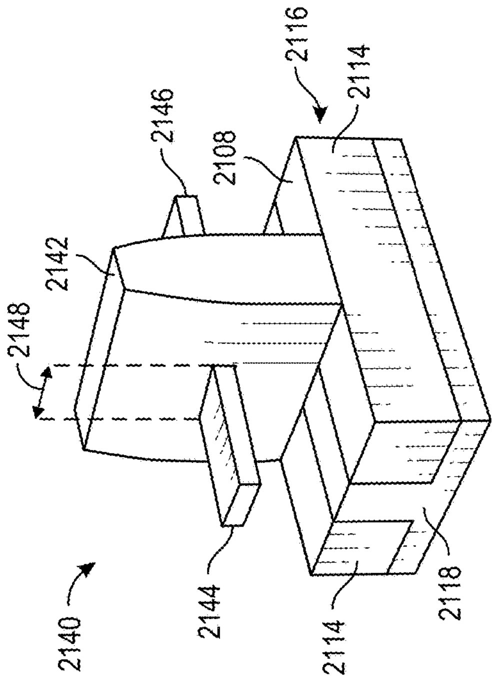

FIG. 21C is a perspective view of a gate-all-around (GAA) transistor 2140 comprising a gate 2142 that controls current flow between a source region 2144 and a drain region 2146. The transistor 2140 is non-planar in that the source region 2144 and the drain region 2146 are elevated from the substrate surface 2128.

FIG. 21D is a perspective view of a GAA transistor 2160 comprising a gate 2162 that controls current flow between multiple elevated source regions 2164 and multiple elevated drain regions 2166. The transistor 2160 is a stacked GAA transistor as the gate controls the flow of current between multiple elevated S/D regions stacked on top of each other. The transistors 2140 and 2160 are considered gate-all-around transistors as the gates encompass all sides of the semiconductor portions that extends from the source regions to the drain regions. The transistors 2140 and 2160 can alternatively be referred to as nanowire, nanosheet, or nanoribbon transistors depending on the width (e.g., widths 2148 and 2168 of transistors 2140 and 2160, respectively) of the semiconductor portions extending through the gate.

Returning to FIG. 20, a transistor 2040 may include a gate 2022 formed of at least two layers, a gate dielectric and a gate electrode. The gate dielectric may include one layer or a stack of layers. The one or more layers may include silicon oxide, silicon dioxide, silicon carbide, and/or a high-k dielectric material.

The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric to improve its quality when a high-k material is used.

The gate electrode may be formed on the gate dielectric and may include at least one p-type work function metal or n-type work function metal, depending on whether the transistor 2040 is to be a p-type metal oxide semiconductor (PMOS) or an n-type metal oxide semiconductor (NMOS) transistor. In some implementations, the gate electrode may consist of a stack of two or more metal layers, where one or more metal layers are work function metal layers and at least one metal layer is a fill metal layer. Further metal layers may be included for other purposes, such as a barrier layer.

For a PMOS transistor, metals that may be used for the gate electrode include, but are not limited to, ruthenium, palladium, platinum, cobalt, nickel, conductive metal oxides (e.g., ruthenium oxide), and any of the metals discussed below with reference to an NMOS transistor (e.g., for work function tuning). For an NMOS transistor, metals that may be used for the gate electrode include, but are not limited to, hafnium, zirconium, titanium, tantalum, aluminum, alloys of these metals, carbides of these metals (e.g., hafnium carbide, zirconium carbide, titanium carbide, tantalum carbide, and aluminum carbide), and any of the metals discussed above with reference to a PMOS transistor (e.g., for work function tuning).

In some embodiments, when viewed as a cross-section of the transistor 2040 along the source-channel-drain direction, the gate electrode may consist of a U-shaped structure that includes a bottom portion substantially parallel to the surface of the die substrate 2002 and two sidewall portions that are substantially perpendicular to the top surface of the die substrate 2002. In other embodiments, at least one of the metal layers that form the gate electrode may simply be a planar layer that is substantially parallel to the top surface of the die substrate 2002 and does not include sidewall portions substantially perpendicular to the top surface of the die substrate 2002. In other embodiments, the gate electrode may consist of a combination of U-shaped structures and planar, non-U-shaped structures. For example, the gate electrode may consist of one or more U-shaped metal layers formed atop one or more planar, non-U-shaped layers.

In some embodiments, a pair of sidewall spacers may be formed on opposing sides of the gate stack to bracket the gate stack. The sidewall spacers may be formed from materials such as silicon nitride, silicon oxide, silicon carbide, silicon nitride doped with carbon, and silicon oxynitride. Processes for forming sidewall spacers are well known in the art and generally include deposition and etching process steps. In some embodiments, a plurality of spacer pairs may be used; for instance, two pairs, three pairs, or four pairs of sidewall spacers may be formed on opposing sides of the gate stack.

The S/D regions 2020 may be formed within the die substrate 2002 adjacent to the gate 2022 of individual transistors 2040. The S/D regions 2020 may be formed using an implantation/diffusion process or an etching/deposition process, for example. In the former process, dopants such as boron, aluminum, antimony, phosphorous, or arsenic may be ion-implanted into the die substrate 2002 to form the S/D regions 2020. An annealing process that activates the dopants and causes them to diffuse farther into the die substrate 2002 may follow the ion-implantation process. In the latter process, the die substrate 2002 may first be etched to form recesses at the locations of the S/D regions 2020. An epitaxial deposition process may then be carried out to fill the recesses with material that is used to fabricate the S/D regions 2020. In some implementations, the S/D regions 2020 may be fabricated using a silicon alloy such as silicon germanium or silicon carbide. In some embodiments, the epitaxially deposited silicon alloy may be doped in situ with dopants such as boron, arsenic, or phosphorous. In some embodiments, the S/D regions 2020 may be formed using one or more alternate semiconductor materials such as germanium or a group III-V material or alloy. In further embodiments, one or more layers of metal and/or metal alloys may be used to form the S/D regions 2020.

Electrical signals, such as power and/or input/output (I/O) signals, may be routed to and/or from the devices (e.g., transistors 2040) of the device layer 2004 through one or more interconnect layers disposed on the device layer 2004 (illustrated in FIG. 20 as interconnect layers 2006-2010). For example, electrically conductive features of the device layer 2004 (e.g., the gate 2022 and the S/D contacts 2024) may be electrically coupled with the interconnect structures 2028 of the interconnect layers 2006-2010. The one or more interconnect layers 2006-2010 may form a metallization stack (also referred to as an "ILD stack") 2019 of the integrated circuit device 2000.

The interconnect structures 2028 may be arranged within the interconnect layers 2006-2010 to route electrical signals according to a wide variety of designs; in particular, the arrangement is not limited to the particular configuration of interconnect structures 2028 depicted in FIG. 20. Although a particular number of interconnect layers 2006-2010 is depicted in FIG. 20, embodiments of the present disclosure include integrated circuit devices having more or fewer interconnect layers than depicted.

In some embodiments, the interconnect structures 2028 may include lines 2028*a* and/or vias 2028*b* filled with an electrically conductive material such as a metal. The lines 2028*a* may be arranged to route electrical signals in a direction of a plane that is substantially parallel with a surface of the die substrate 2002 upon which the device layer 2004 is formed. For example, the lines 2028*a* may route electrical signals in a direction in and out of the page and/or in a direction across the page. The vias 2028*b* may be arranged to route electrical signals in a direction of a plane that is substantially perpendicular to the surface of the die substrate 2002 upon which the device layer 2004 is formed. In some embodiments, the vias 2028*b* may electrically couple lines 2028*a* of different interconnect layers 2006-2010 together.

The interconnect layers 2006-2010 may include a dielectric material 2026 disposed between the interconnect structures 2028, as shown in FIG. 20. In some embodiments, dielectric material 2026 disposed between the interconnect structures 2028 in different ones of the interconnect layers 2006-2010 may have different compositions; in other embodiments, the composition of the dielectric material 2026 between different interconnect layers 2006-2010 may be the same. The device layer 2004 may include a dielectric material 2026 disposed between the transistors 2040 and a bottom layer of the metallization stack as well. The dielectric material 2026 included in the device layer 2004 may have a different composition than the dielectric material 2026 included in the interconnect layers 2006-2010; in other embodiments, the composition of the dielectric material 2026 in the device layer 2004 may be the same as a dielectric material 2026 included in any one of the interconnect layers 2006-2010.

A first interconnect layer 2006 (referred to as Metal 1 or "M1") may be formed directly on the device layer 2004. In some embodiments, the first interconnect layer 2006 may include lines 2028*a* and/or vias 2028*b*, as shown. The lines 2028*a* of the first interconnect layer 2006 may be coupled with contacts (e.g., the S/D contacts 2024) of the device layer 2004. The vias 2028*b* of the first interconnect layer 2006 may be coupled with the lines 2028*a* of a second interconnect layer 2008.

The second interconnect layer 2008 (referred to as Metal 2 or "M2") may be formed directly on the first interconnect layer 2006. In some embodiments, the second interconnect layer 2008 may include via 2028*b* to couple the lines 2028 of the second interconnect layer 2008 with the lines 2028*a* of a third interconnect layer 2010. Although the lines 2028*a* and the vias 2028*b* are structurally delineated with a line within individual interconnect layers for the sake of clarity, the lines 2028*a* and the vias 2028*b* may be structurally and/or materially contiguous (e.g., simultaneously filled during a dual-damascene process) in some embodiments.

The third interconnect layer 2010 (referred to as Metal 3 or "M3") (and additional interconnect layers, as desired) may be formed in succession on the second interconnect layer 2008 according to similar techniques and configurations described in connection with the second interconnect layer 2008 or the first interconnect layer 2006. In some embodiments, the interconnect layers that are "higher up" in the metallization stack 2019 in the integrated circuit device 2000 (i.e., farther away from the device layer 2004) may be thicker that the interconnect layers that are lower in the metallization stack 2019, with lines 2028*a* and vias 2028*b* in the higher interconnect layers being thicker than those in the lower interconnect layers.

The integrated circuit device 2000 may include a solder resist material 2034 (e.g., polyimide or similar material) and one or more conductive contacts 2036 formed on the interconnect layers 2006-2010. In FIG. 20, the conductive contacts 2036 are illustrated as taking the form of bond pads. The conductive contacts 2036 may be electrically coupled with the interconnect structures 2028 and configured to route the electrical signals of the transistor(s) 2040 to external devices. For example, solder bonds may be formed on the one or more conductive contacts 2036 to mechanically and/or electrically couple an integrated circuit die including the integrated circuit device 2000 with another component (e.g., a printed circuit board). The integrated circuit device 2000 may include additional or alternate structures to route the electrical signals from the interconnect layers 2006-2010; for example, the conductive contacts 2036 may include other analogous features (e.g., posts) that route the electrical signals to external components.

In some embodiments in which the integrated circuit device 2000 is a double-sided die, the integrated circuit device 2000 may include another metallization stack (not shown) on the opposite side of the device layer(s) 2004. This metallization stack may include multiple interconnect layers as discussed above with reference to the interconnect layers 2006-2010, to provide conductive pathways (e.g., including conductive lines and vias) between the device layer(s) 2004 and additional conductive contacts (not shown) on the opposite side of the integrated circuit device 2000 from the conductive contacts 2036.

In other embodiments in which the integrated circuit device 2000 is a double-sided die, the integrated circuit device 2000 may include one or more through silicon vias (TSVs) through the die substrate 2002; these TSVs may make contact with the device layer(s) 2004, and may provide conductive pathways between the device layer(s) 2004 and additional conductive contacts (not shown) on the opposite side of the integrated circuit device 2000 from the conductive contacts 2036. In some embodiments, TSVs extending through the substrate can be used for routing power and ground signals from conductive contacts on the opposite side of the integrated circuit device 2000 from the conductive contacts 2036 to the transistors 2040 and any other components integrated into the die 2000, and the metallization stack 2019 can be used to route I/O signals from the conductive contacts 2036 to transistors 2040 and any other components integrated into the die 2000.

Multiple integrated circuit devices 2000 may be stacked with one or more TSVs in the individual stacked devices providing connection between one of the devices to any of the other devices in the stack. For example, one or more high-bandwidth memory (HBM) integrated circuit dies can be stacked on top of a base integrated circuit die and TSVs in the HBM dies can provide connection between the individual HBM and the base integrated circuit die. Conductive contacts can provide additional connections between adjacent integrated circuit dies in the stack. In some embodiments, the conductive contacts can be fine-pitch solder bumps (microbumps).

Figure 22:
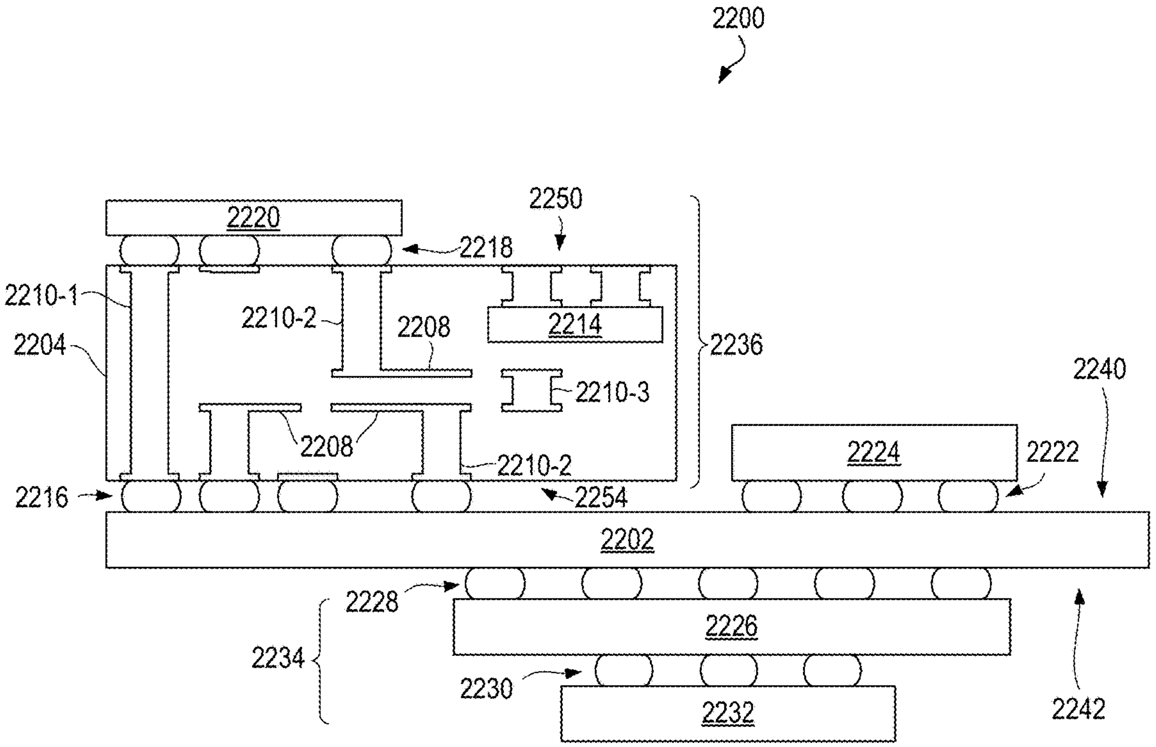
FIG. 22 is a cross-sectional side view of an integrated circuit device assembly that may include a microelectronic assembly, in accordance with any of the embodiments disclosed herein.

FIG. 22 is a cross-sectional side view of an integrated circuit device assembly 2200 that may be included in any of the systems 100, 400, 500, 600, 700 disclosed herein. The integrated circuit device assembly 2200 includes a number of components disposed on a circuit board 2202 (which may be a motherboard, system board, mainboard, etc.). The integrated circuit device assembly 2200 includes components disposed on a first face 2240 of the circuit board 2202 and an opposing second face 2242 of the circuit board 2202; generally, components may be disposed on one or both faces 2240 and 2242.

In some embodiments, the circuit board 2202 may be a printed circuit board (PCB) including multiple metal (or interconnect) layers separated from one another by layers of dielectric material and interconnected by electrically conductive vias. The individual metal layers comprise conductive traces. Any one or more of the metal layers may be formed in a desired circuit pattern to route electrical signals (optionally in conjunction with other metal layers) between the components coupled to the circuit board 2202. In other embodiments, the circuit board 2202 may be a non-PCB substrate. The integrated circuit device assembly 2200 illustrated in FIG. 22 includes a package-on-interposer structure 2236 coupled to the first face 2240 of the circuit board 2202 by coupling components 2216. The coupling components 2216 may electrically and mechanically couple the package-on-interposer structure 2236 to the circuit board 2202, and may include solder balls (as shown in FIG. 22), pins (e.g., as part of a pin grid array (PGA), contacts (e.g., as part of a land grid array (LGA)), male and female portions of a socket, an adhesive, an underfill material, and/or any other suitable electrical and/or mechanical coupling structure.

The package-on-interposer structure 2236 may include an integrated circuit component 2220 coupled to an interposer 2204 by coupling components 2218. The coupling components 2218 may take any suitable form for the application, such as the forms discussed above with reference to the coupling components 2216. Although a single integrated circuit component 2220 is shown in FIG. 22, multiple integrated circuit components may be coupled to the interposer 2204; indeed, additional interposers may be coupled to the interposer 2204. The interposer 2204 may provide an intervening substrate used to bridge the circuit board 2202 and the integrated circuit component 2220.

The integrated circuit component 2220 may be a packaged or unpacked integrated circuit product that includes one or more integrated circuit dies (e.g., the die 1902 of FIG. 19, the integrated circuit device 2000 of FIG. 20) and/or one or more other suitable components. A packaged integrated circuit component comprises one or more integrated circuit dies mounted on a package substrate with the integrated circuit dies and package substrate encapsulated in a casing material, such as a metal, plastic, glass, or ceramic. In one example of an unpackaged integrated circuit component 2220, a single monolithic integrated circuit die comprises solder bumps attached to contacts on the die. The solder bumps allow the die to be directly attached to the interposer 2204. The integrated circuit component 2220 can comprise one or more computing system components, such as one or more processor units (e.g., system-on-a-chip (SoC), processor core, graphics processor unit (GPU), accelerator, chipset processor), I/O controller, memory, or network interface controller. In some embodiments, the integrated circuit component 2220 can comprise one or more additional active or passive devices such as capacitors, decoupling capacitors, resistors, inductors, fuses, diodes, transformers, sensors, electrostatic discharge (ESD) devices, and memory devices.

In embodiments where the integrated circuit component 2220 comprises multiple integrated circuit dies, they dies can be of the same type (a homogeneous multi-die integrated circuit component) or of two or more different types (a heterogeneous multi-die integrated circuit component). A multi-die integrated circuit component can be referred to as a multi-chip package (MCP) or multi-chip module (MCM).

In addition to comprising one or more processor units, the integrated circuit component 2220 can comprise additional components, such as embedded DRAM, stacked high bandwidth memory (HBM), shared cache memories, input/output (I/O) controllers, or memory controllers. Any of these additional components can be located on the same integrated circuit die as a processor unit, or on one or more integrated circuit dies separate from the integrated circuit dies comprising the processor units. These separate integrated circuit dies can be referred to as "chiplets". In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Generally, the interposer 2204 may spread connections to a wider pitch or reroute a connection to a different connection. For example, the interposer 2204 may couple the integrated circuit component 2220 to a set of ball grid array (BGA) conductive contacts of the coupling components 2216 for coupling to the circuit board 2202. In the embodiment illustrated in FIG. 22, the integrated circuit component 2220 and the circuit board 2202 are attached to opposing sides of the interposer 2204; in other embodiments, the integrated circuit component 2220 and the circuit board 2202 may be attached to a same side of the interposer 2204. In some embodiments, three or more components may be interconnected by way of the interposer 2204.

In some embodiments, the interposer 2204 may be formed as a PCB, including multiple metal layers separated from one another by layers of dielectric material and interconnected by electrically conductive vias. In some embodiments, the interposer 2204 may be formed of an epoxy resin, a fiberglass-reinforced epoxy resin, an epoxy resin with inorganic fillers, a ceramic material, or a polymer material such as polyimide. In some embodiments, the interposer 2204 may be formed of alternate rigid or flexible materials that may include the same materials described above for use in a semiconductor substrate, such as silicon, germanium, and other group III-V and group IV materials. The interposer 2204 may include metal interconnects 2208 and vias 2210, including but not limited to through hole vias 2210-1 (that extend from a first face 2250 of the interposer 2204 to a second face 2254 of the interposer 2204), blind vias 2210-2 (that extend from the first or second faces 2250 or 2254 of the interposer 2204 to an internal metal layer), and buried vias 2210-3 (that connect internal metal layers).

In some embodiments, the interposer 2204 can comprise a silicon interposer. Through silicon vias (TSV) extending through the silicon interposer can connect connections on a first face of a silicon interposer to an opposing second face of the silicon interposer. In some embodiments, an interposer 2204 comprising a silicon interposer can further comprise one or more routing layers to route connections on a first face of the interposer 2204 to an opposing second face of the interposer 2204.

The interposer 2204 may further include embedded devices 2214, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 2204. The package-on-interposer structure 2236 may take the form of any of the package-on-interposer structures known in the art. In embodiments where the interposer is a non-printed circuit board The integrated circuit device assembly 2200 may include an integrated circuit component 2224 coupled to the first face 2240 of the circuit board 2202 by coupling components 2222. The coupling components 2222 may take the form of any of the embodiments discussed above with reference to the coupling components 2216, and the integrated circuit component 2224 may take the form of any of the embodiments discussed above with reference to the integrated circuit component 2220.

The integrated circuit device assembly 2200 illustrated in FIG. 22 includes a package-on-package structure 2234 coupled to the second face 2242 of the circuit board 2202 by coupling components 2228. The package-on-package structure 2234 may include an integrated circuit component 2226 and an integrated circuit component 2232 coupled together by coupling components 2230 such that the integrated circuit component 2226 is disposed between the circuit board 2202 and the integrated circuit component 2232. The coupling components 2228 and 2230 may take the form of any of the embodiments of the coupling components 2216 discussed above, and the integrated circuit components 2226 and 2232 may take the form of any of the embodiments of the integrated circuit component 2220 discussed above. The package-on-package structure 2234 may be configured in accordance with any of the package-on-package structures known in the art.

Figure 23:
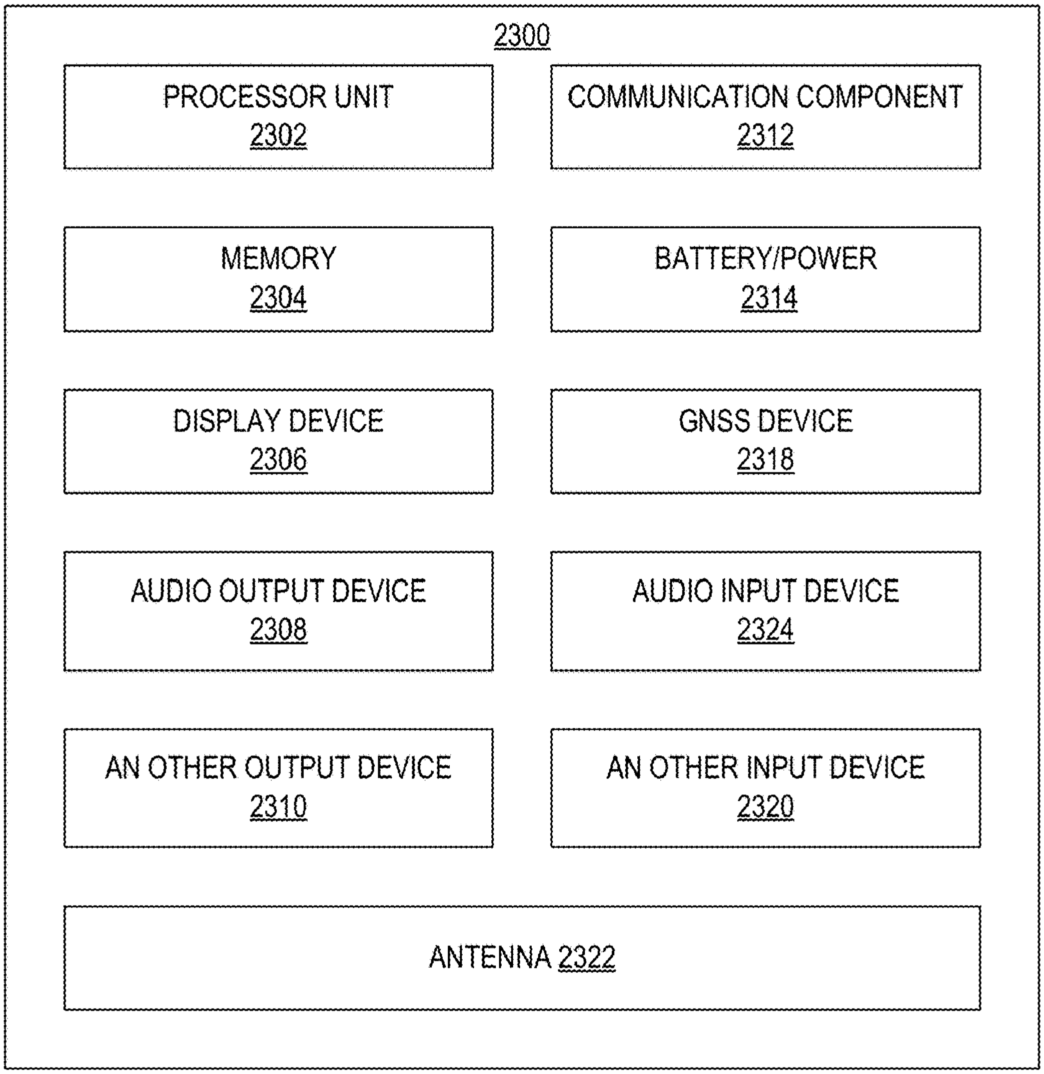
FIG. 23 is a block diagram of an example electrical device that may include a microelectronic assembly, in accordance with any of the embodiments disclosed herein.

FIG. 23 is a block diagram of an example electrical device 2300 that may include or be included in one or more of the systems 100, 400, 500, 600, 700 disclosed herein. For example, any suitable ones of the components of the electrical device 2300 may include one or more of the integrated circuit device assemblies 2200, integrated circuit components 2220, integrated circuit devices 2000, or integrated circuit dies 1902 disclosed herein, and may be arranged in any of the systems 100, 400, 500, 600, 700 disclosed herein. A number of components are illustrated in FIG. 23 as included in the electrical device 2300, but any one or more of these components may be omitted or duplicated, as suitable for the application. In some embodiments, some or all of the components included in the electrical device 2300 may be attached to one or more motherboards mainboards, or system boards. In some embodiments, one or more of these components are fabricated onto a single system-on-a-chip (SoC) die.

Additionally, in various embodiments, the electrical device 2300 may not include one or more of the components illustrated in FIG. 23, but the electrical device 2300 may include interface circuitry for coupling to the one or more components. For example, the electrical device 2300 may not include a display device 2306, but may include display device interface circuitry (e.g., a connector and driver circuitry) to which a display device 2306 may be coupled. In another set of examples, the electrical device 2300 may not include an audio input device 2324 or an audio output device 2308, but may include audio input or output device interface circuitry (e.g., connectors and supporting circuitry) to which an audio input device 2324 or audio output device 2308 may be coupled.

The electrical device 2300 may include one or more processor units 2302 (e.g., one or more processor units). As used herein, the terms "processor unit", "processing unit" or "processor" may refer to any device or portion of a device that processes electronic data from registers and/or memory to transform that electronic data into other electronic data that may be stored in registers and/or memory. The processor unit 2302 may include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller cryptoprocessors (specialized processors that execute cryptographic algorithms within hardware), server processors, controllers, or any other suitable type of processor units. As such, the processor unit can be referred to as an XPU (or xPU).

The electrical device 2300 may include a memory 2304, which may itself include one or more memory devices such as volatile memory (e.g., dynamic random access memory (DRAM), static random-access memory (SRAM)), non-volatile memory (e.g., read-only memory (ROM), flash memory, chalcogenide-based phase-change non-voltage memories), solid state memory, and/or a hard drive. In some embodiments, the memory 2304 may include memory that is located on the same integrated circuit die as the processor unit 2302. This memory may be used as cache memory (e.g., Level 1 (L1), Level 2 (L2), Level 3 (L3), Level 4 (L4), Last Level Cache (LLC)) and may include embedded dynamic random access memory (eDRAM) or spin transfer torque magnetic random access memory (STT-MRAM).

In some embodiments, the electrical device 2300 can comprise one or more processor units 2302 that are heterogeneous or asymmetric to another processor unit 2302 in the electrical device 2300. There can be a variety of differences between the processing units 2302 in a system in terms of a spectrum of metrics of merit including architectural, microarchitectural, thermal, power consumption characteristics, and the like. These differences can effectively manifest themselves as asymmetry and heterogeneity among the processor units 2302 in the electrical device 2300.

In some embodiments, the electrical device 2300 may include a communication component 2312 (e.g., one or more communication components). For example, the communication component 2312 can manage wireless communications for the transfer of data to and from the electrical device 2300. The term "wireless" and its derivatives may be used to describe circuits, devices, systems, methods, techniques, communications channels, etc., that may communicate data through the use of modulated electromagnetic radiation through a nonsolid medium. The term "wireless" does not imply that the associated devices do not contain any wires, although in some embodiments they might not.

The communication component 2312 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication component 2312 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication component 2312 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication component 2312 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication component 2312 may operate in accordance with other wireless protocols in other embodiments. The electrical device 2300 may include an antenna 2322 to facilitate wireless communications and/or to receive other wireless communications (such as AM or FM radio transmissions).

In some embodiments, the communication component 2312 may manage wired communications, such as electrical, optical, or any other suitable communication protocols (e.g., IEEE 802.3 Ethernet standards). As noted above, the communication component 2312 may include multiple communication components. For instance, a first communication component 2312 may be dedicated to shorter-range wireless communications such as Wi-Fi or Bluetooth, and a second communication component 2312 may be dedicated to longer-range wireless communications such as global positioning system (GPS), EDGE, GPRS, CDMA, WiMAX, LTE, EV-DO, or others. In some embodiments, a first communication component 2312 may be dedicated to wireless communications, and a second communication component 2312 may be dedicated to wired communications.

The electrical device 2300 may include battery/power circuitry 2314. The battery/power circuitry 2314 may include one or more energy storage devices (e.g., batteries or capacitors) and/or circuitry for coupling components of the electrical device 2300 to an energy source separate from the electrical device 2300 (e.g., AC line power).

The electrical device 2300 may include a display device 2306 (or corresponding interface circuitry, as discussed above). The display device 2306 may include one or more embedded or wired or wirelessly connected external visual indicators, such as a heads-up display, a computer monitor, a projector, a touchscreen display, a liquid crystal display (LCD), a light-emitting diode display, or a flat panel display.

The electrical device 2300 may include an audio output device 2308 (or corresponding interface circuitry, as discussed above). The audio output device 2308 may include any embedded or wired or wirelessly connected external device that generates an audible indicator, such speakers, headsets, or earbuds.

The electrical device 2300 may include an audio input device 2324 (or corresponding interface circuitry, as discussed above). The audio input device 2324 may include any embedded or wired or wirelessly connected device that generates a signal representative of a sound, such as microphones, microphone arrays, or digital instruments (e.g., instruments having a musical instrument digital interface (MIDI) output). The electrical device 2300 may include a Global Navigation Satellite System (GNSS) device 2318 (or corresponding interface circuitry, as discussed above), such as a Global Positioning System (GPS) device. The GNSS device 2318 may be in communication with a satellite-based system and may determine a geolocation of the electrical device 2300 based on information received from one or more GNSS satellites, as known in the art.

The electrical device 2300 may include an other output device 2310 (or corresponding interface circuitry, as discussed above). Examples of the other output device 2310 may include an audio codec, a video codec, a printer, a wired or wireless transmitter for providing information to other devices, or an additional storage device.

The electrical device 2300 may include an other input device 2320 (or corresponding interface circuitry, as discussed above). Examples of the other input device 2320 may include an accelerometer, a gyroscope, a compass, an image capture device (e.g., monoscopic or stereoscopic camera), a trackball, a trackpad, a touchpad, a keyboard, a cursor control device such as a mouse, a stylus, a touchscreen, proximity sensor, microphone, a bar code reader, a Quick Response (QR) code reader, electrocardiogram (ECG) sensor, PPG (photoplethysmogram) sensor, galvanic skin response sensor, any other sensor, or a radio frequency identification (RFID) reader.

The electrical device 2300 may have any desired form factor, such as a hand-held or mobile electrical device (e.g., a cell phone, a smart phone, a mobile internet device, a music player, a tablet computer, a laptop computer, a 2-in-1 convertible computer, a portable all-in-one computer, a netbook computer, an ultrabook computer, a personal digital assistant (PDA), an ultra mobile personal computer, a portable gaming console, etc.), a desktop electrical device, a server, a rack-level computing solution (e.g., blade, tray or sled computing systems), a workstation or other networked computing component, a printer, a scanner, a monitor, a set-top box, an entertainment control unit, a stationary gaming console, smart television, a vehicle control unit, a digital camera, a digital video recorder, a wearable electrical device or an embedded computing system (e.g., computing systems that are part of a vehicle, smart home appliance, consumer electronics product or equipment, manufacturing equipment). In some embodiments, the electrical device 2300 may be any other electronic device that processes data. In some embodiments, the electrical device 2300 may comprise multiple discrete physical components. Given the range of devices that the electrical device 2300 can be manifested as in various embodiments, in some embodiments, the electrical device 2300 can be referred to as a computing device or a computing system.

EXAMPLES

Illustrative examples of the technologies disclosed herein are provided below. An embodiment of the technologies may include any one or more, and any combination of, the examples described below.

Example 1 includes an apparatus comprising a laser; a glass substrate comprising a pump waveguide, wherein an output of the laser is coupled to the pump waveguide; and a signal waveguide, wherein at least a portion of the pump waveguide is adjacent the signal waveguide, wherein the signal waveguide is doped with an element that, when pumped by the laser, amplifies a signal in the signal waveguide; and a photonic integrated circuit (PIC) die comprising a detector coupled to the signal waveguide.

Example 2 includes the subject matter of Example 1, and wherein the signal waveguide is a first signal waveguide, wherein the pump waveguide is a first pump waveguide, wherein the apparatus further comprises a beam splitter disposed in a cavity defined in the glass substrate to split the laser into a first mode and a second mode, wherein the first mode is coupled to the first pump waveguide, wherein the glass substrate further comprises a second pump waveguide, wherein the second mode of the laser is coupled to the second pump waveguide; and a second signal waveguide, wherein at least a portion of the second pump waveguide is adjacent the second signal waveguide, wherein the second signal waveguide is doped with an element that, when pumped by the laser, amplifies a signal in the second signal waveguide.

Example 3 includes the subject matter of any of Examples 1 and 2, and wherein the laser is an input pump laser, wherein the signal waveguide is an input signal waveguide, wherein the pump waveguide is an input pump waveguide, wherein the apparatus further comprises an output pump laser, wherein the glass substrate further comprises an output pump waveguide, wherein the output pump laser is coupled to the output pump waveguide; and an output signal waveguide, wherein at least a portion of the output pump waveguide is adjacent the output signal waveguide, wherein the output signal waveguide is doped with an element that, when pumped by the output pump laser, amplifies a signal in the output signal waveguide.

Example 4 includes the subject matter of any of Examples 1-3, and wherein a power of the output pump laser is at least partially based on a coupling of an output waveguide of the PIC die to the output signal waveguide of the glass substrate.

Example 5 includes the subject matter of any of Examples 1-4, and further including a plurality of lasers, wherein the plurality of lasers comprises the laser, wherein the glass substrate comprises a plurality of pump waveguides, wherein the plurality of pump waveguides comprises the pump waveguide, wherein the glass substrate comprises a plurality of signal waveguides, wherein the plurality of signal waveguides comprises the signal waveguide, wherein individual lasers of the plurality of lasers are coupled to individual pump waveguides of the plurality of pump waveguides, wherein at least a portion individual pump waveguides of the plurality of pump waveguides is adjacent a corresponding signal waveguide of the plurality of signal waveguides, wherein individual signal waveguides of the plurality of signal waveguides are doped with an element that, when pumped by the corresponding laser of the plurality of lasers, amplifies signals in the corresponding signal waveguide.

Example 6 includes the subject matter of any of Examples 1-5, and wherein the PIC die comprises the laser.

Example 7 includes the subject matter of any of Examples 1-6, and wherein a power of the laser is at least partially based on a power detected by the detector.

Example 8 includes the subject matter of any of Examples 1-7, and wherein the glass substrate comprises silicon and oxygen, wherein the PIC die comprises silicon, wherein the PIC die is separate from the glass substrate.

Example 9 includes the subject matter of any of Examples 1-8, and wherein the PIC die comprises the glass substrate.

Example 10 includes the subject matter of any of Examples 1-9, and further including an optical fiber coupled to the signal waveguide, wherein the optical fiber is disposed in a V-groove defined in the glass substrate.

Example 11 includes the subject matter of any of Examples 1-10, and further including an electrical integrated circuit (EIC) and an embedded multi-die interconnect bridge (EMIB), wherein the EMIB is connected to the EIC and the PIC die.

Example 12 includes the subject matter of any of Examples 1-11, and wherein the element is erbium.

Example 13 includes the subject matter of any of Examples 1-12, and wherein the element is praseodymium.

Example 14 includes an apparatus comprising a glass interposer comprising a pump waveguide; and a signal waveguide, wherein at least a portion of the pump waveguide is adjacent with the signal waveguide, wherein the signal waveguide is doped with an element that, when pumped by a laser, amplifies a signal in the signal waveguide, wherein a first cavity is defined in the glass interposer, wherein the pump waveguide extends to the first cavity, wherein a second cavity is defined in the glass interposer, wherein the signal waveguide extends to the second cavity.

Example 15 includes the subject matter of Example 14, and further including a laser disposed in the first cavity and a photonic integrated circuit (PIC) die disposed in the second cavity.

Example 16 includes the subject matter of any of Examples 14 and 15, and wherein the signal waveguide is a first signal waveguide, wherein the pump waveguide is a first pump waveguide, wherein the apparatus further comprises a beam splitter disposed in a cavity of the glass interposer to split the laser into a first mode and a second mode, wherein the first mode is coupled to the first pump waveguide, wherein the glass interposer further comprises a second pump waveguide, wherein the second mode of the laser is coupled to the second pump waveguide; and a second signal waveguide, wherein a mode of the second pump waveguide overlaps with the second signal waveguide, wherein the second signal waveguide is doped with an element that, when pumped by the laser, amplifies a signal in the second signal waveguide.

Example 17 includes the subject matter of any of Examples 14-16, and wherein the signal waveguide is an input signal waveguide, wherein the pump waveguide is an input pump waveguide, the apparatus further comprising an input pump laser, and an output pump laser, wherein the glass interposer further comprises an output pump waveguide, wherein the output pump laser is coupled to the output pump waveguide; and an output signal waveguide, wherein at least a portion of the output pump waveguide is adjacent the output signal waveguide, wherein the output signal waveguide is doped with an element that, when pumped by the output pump laser, amplifies a signal in the output signal waveguide.

Example 18 includes the subject matter of any of Examples 14-17, and wherein a power of the output pump laser is at least partially based on a coupling of an output waveguide of the PIC die to the output signal waveguide of the glass interposer.

Example 19 includes the subject matter of any of Examples 14-18, and further including a plurality of lasers, wherein the plurality of lasers comprises the laser, wherein the glass interposer comprises a plurality of pump waveguides, wherein the plurality of pump waveguides comprises the pump waveguide, wherein the glass interposer comprises a plurality of signal waveguides, wherein the plurality of signal waveguides comprises the signal waveguide, wherein individual lasers of the plurality of lasers are coupled to individual pump waveguides of the plurality of pump waveguides, wherein at least a portion of individual pump waveguides of the plurality of pump waveguides is adjacent a corresponding signal waveguide of the plurality of signal waveguides, wherein individual signal waveguides of the plurality of signal waveguides are doped with an element that, when pumped by the corresponding laser of the plurality of lasers, amplifies signals in the corresponding signal waveguide.

Example 20 includes the subject matter of any of Examples 14-19, and further including a PIC die, wherein the PIC die comprises a detector coupled to the signal waveguide.

Example 21 includes the subject matter of any of Examples 14-20, and wherein the PIC die comprises the laser.

Example 22 includes the subject matter of any of Examples 14-21, and wherein a power of the laser is at least partially based on a power detected by the detector.

Example 23 includes the subject matter of any of Examples 14-22, and wherein the glass interposer comprises silicon and oxygen, wherein the PIC die comprises silicon.

Example 24 includes the subject matter of any of Examples 14-23, and further including an electrical integrated circuit (EIC) and an embedded multi-die interconnect bridge (EMIB), wherein the EMIB is connected to the EIC and the PIC die, wherein the PIC die, the EIC, and the EMIB are at least partially disposed in the second cavity.

Example 25 includes the subject matter of any of Examples 14-24, and further including an optical fiber coupled to the signal waveguide, wherein the optical fiber is disposed in a V-groove defined in the glass interposer.

Example 26 includes the subject matter of any of Examples 14-25, and wherein the element is erbium.

Example 27 includes the subject matter of any of Examples 14-26, and wherein the element is praseodymium.

Example 28 includes an apparatus comprising a glass interposer comprising a signal waveguide; a photonic integrated circuit (PIC) die comprising a detector coupled to the signal waveguide; and means for amplifying a signal in the signal waveguide.

Example 29 includes the subject matter of Example 28, and wherein the signal waveguide is an input signal waveguide, wherein the glass interposer further comprises an output signal waveguide, further comprising means for amplifying a signal in the output signal waveguide.

Example 30 includes the subject matter of any of Examples 28 and 29, and wherein an amplification provided by the means for amplifying the signal in the output signal waveguide is at least partially based on a coupling of an output waveguide of the PIC die to the output signal waveguide of the glass interposer.

Example 31 includes the subject matter of any of Examples 28-30, and wherein an amplification provided by the means for amplifying the signal in the signal waveguide is at least partially based on a power detected by the detector.

Example 32 includes the subject matter of any of Examples 28-31, and wherein the glass interposer comprises silicon and oxygen, wherein the PIC die comprises silicon.

Example 33 includes the subject matter of any of Examples 28-32, and further including an optical fiber coupled to the signal waveguide, wherein the optical fiber is disposed in a V-groove defined in the glass interposer.

Example 34 includes the subject matter of any of Examples 28-33, and further including an electrical integrated circuit (EIC) and an embedded multi-die interconnect bridge (EMIB), wherein the EMIB is connected to the EIC and the PIC die.

Example 35 includes the subject matter of any of Examples 28-34, and wherein the means for amplifying the signal in the signal waveguide comprises erbium.

Example 36 includes the subject matter of any of Examples 28-35, and wherein the means for amplifying the signal in the signal waveguide comprises praseodymium.

Example 37 includes a method comprising direct writing a signal waveguide and a pump waveguide on a glass interposer; applying a metal layer on the glass interposer over the signal waveguide and the pump waveguide; applying a resist laminate over the metal layer; exposing and etching the resist laminate to expose the signal waveguide; removing the metal layer over the signal waveguide; removing the resist laminate; implanting ions in the signal waveguide; and removing the metal layer from the glass interposer.

Example 38 includes the subject matter of Example 37, and further including mating a laser with the glass interposer, wherein an output of the laser is coupled to the pump waveguide; and mating a photonic integrated circuit (PIC) die with the glass interposer, wherein a detector of the PIC die is coupled to the signal waveguide.

Example 39 includes the subject matter of any of Examples 37 and 38, and further including coupling light from the laser into the pump waveguide, wherein light in the pump waveguide is absorbed by the ions in the signal waveguide; and amplifying a signal in the signal waveguide with use of the ions in the signal waveguide.

The invention claimed is:

1. An apparatus comprising:

a laser;

a glass substrate comprising:

a pump waveguide, wherein an output of the laser is coupled to the pump waveguide; and a signal waveguide, wherein at least a portion of the pump waveguide is adjacent the signal waveguide, wherein the signal waveguide is doped with an element that, when pumped by the laser, amplifies a signal in the signal waveguide, wherein the signal waveguide is a first signal waveguide, wherein the pump waveguide is a first pump waveguide; and a photonic integrated circuit (PIC) die comprising a detector coupled to the signal waveguide, wherein the apparatus further comprises a beam splitter disposed in a cavity defined in the glass substrate to split the laser into a first mode and a second mode, wherein the first mode is coupled to the first pump waveguide, wherein the glass substrate further comprises:

a second pump waveguide, wherein the second mode of the laser is coupled to the second pump waveguide; and a second signal waveguide, wherein at least a portion of the second pump waveguide is adjacent the second signal waveguide, wherein the second signal waveguide is doped with an element that, when pumped by the laser, amplifies a signal in the second signal waveguide.

2. The apparatus of claim 1, wherein the laser is an input pump laser, wherein the signal waveguide is an input signal waveguide, wherein the pump waveguide is an input pump waveguide, wherein the apparatus further comprises an output pump laser, wherein the glass substrate further comprises:

an output pump waveguide, wherein the output pump laser is coupled to the output pump waveguide; and an output signal waveguide, wherein at least a portion of the output pump waveguide is adjacent the output signal waveguide, wherein the output signal waveguide is doped with an element that, when pumped by the output pump laser, amplifies a signal in the output signal waveguide.

3. The apparatus of claim 2, wherein a power of the output pump laser is at least partially based on a coupling of an output waveguide of the PIC die to the output signal waveguide of the glass substrate.

4. The apparatus of claim 1, further comprising:

a plurality of lasers, wherein the plurality of lasers comprises the laser, wherein the glass substrate comprises a plurality of pump waveguides, wherein the plurality of pump waveguides comprises the pump waveguide, wherein the glass substrate comprises a plurality of signal waveguides, wherein the plurality of signal waveguides comprises the signal waveguide, wherein individual lasers of the plurality of lasers are coupled to individual pump waveguides of the plurality of pump waveguides, wherein at least a portion individual pump waveguides of the plurality of pump waveguides is adjacent a corresponding signal waveguide of the plurality of signal waveguides, wherein individual signal waveguides of the plurality of signal waveguides are doped with an element that, when pumped by the corresponding laser of the plurality of lasers, amplifies signals in the corresponding signal waveguide.

5. The apparatus of claim 1, wherein the PIC die comprises the laser.

6. The apparatus of claim 1, wherein a power of the laser is at least partially based on a power detected by the detector.

7. The apparatus of claim 1, wherein the glass substrate comprises silicon and oxygen, wherein the PIC die comprises silicon, wherein the PIC die is separate from the glass substrate.

8. The apparatus of claim 1, wherein the PIC die comprises the glass substrate.

9. The apparatus of claim 1, further comprising an optical fiber coupled to the signal waveguide, wherein the optical fiber is disposed in a V-groove defined in the glass substrate.

10. The apparatus of claim 1, further comprising an electrical integrated circuit (EIC) and an embedded multi-die interconnect bridge (EMIB), wherein the EMIB is connected to the EIC and the PIC die.

11. The apparatus of claim 1, wherein the element is erbium.

12. The apparatus of claim 1, wherein the element is praseodymium.

13. An apparatus comprising:

a glass interposer comprising a signal waveguide, wherein the signal waveguide is an input signal waveguide, wherein the glass interposer further comprises an output signal waveguide;

a photonic integrated circuit (PIC) die comprising a detector coupled to the signal waveguide;

means for amplifying a signal in the signal waveguide; and means for amplifying a signal in the output signal waveguide.

14. The apparatus of claim 13, wherein an amplification provided by the means for amplifying the signal in the output signal waveguide is at least partially based on a coupling of an output waveguide of the PIC die to the output signal waveguide of the glass interposer.

15. The apparatus of claim 13, wherein an amplification provided by the means for amplifying the signal in the signal waveguide is at least partially based on a power detected by the detector.

16. The apparatus of claim 1, wherein the laser is an input pump laser, wherein the signal waveguide is an input signal waveguide, wherein the pump waveguide is an input pump waveguide, wherein the apparatus further comprises an output pump laser, wherein the glass substrate further comprises:

an output pump waveguide, wherein the output pump laser is coupled to the output pump waveguide; and an output signal waveguide, wherein at least a portion of the output pump waveguide is adjacent the output signal waveguide, wherein the output signal waveguide is doped with an element that, when pumped by the output pump laser, amplifies a signal in the output signal waveguide, wherein a power of the output pump laser is at least partially based on a coupling of an output waveguide of the PIC die to the output signal waveguide of the glass substrate, further comprising a plurality of lasers, wherein the plurality of lasers comprises the laser, wherein the glass substrate comprises a plurality of pump waveguides, wherein the plurality of pump waveguides comprises the pump waveguide, wherein the glass substrate comprises a plurality of signal waveguides, wherein the plurality of signal waveguides comprises the signal waveguide, wherein individual lasers of the plurality of lasers are coupled to individual pump waveguides of the plurality of pump waveguides, wherein at least a portion individual pump waveguides of the plurality of pump waveguides is adjacent a corresponding signal waveguide of the plurality of signal waveguides, wherein individual signal waveguides of the plurality of signal waveguides are doped with an element that, when pumped by the corresponding laser of the plurality of lasers, amplifies signals in the corresponding signal waveguide, wherein the PIC die comprises the laser, wherein the glass substrate comprises silicon and oxygen, wherein the PIC die comprises silicon, wherein the PIC die is separate from the glass substrate, further comprising an optical fiber coupled to the signal waveguide, wherein the optical fiber is disposed in a V-groove defined in the glass substrate, further comprising an electrical integrated circuit (EIC) and an embedded multi-die interconnect bridge (EMIB), wherein the EMIB is connected to the EIC and the PIC die, wherein the element is erbium.

17. The apparatus of claim 1, wherein a first cavity is defined in the glass substrate, wherein the pump waveguide extends to the first cavity, wherein a second cavity is defined in the glass substrate, wherein the signal waveguide extends to the second cavity.

18. The apparatus of claim 17, further comprising an electrical integrated circuit (EIC) and an embedded multi-die interconnect bridge (EMIB), wherein the EMIB is connected to the EIC and the PIC die, wherein the PIC die, the EIC, and the EMIB are at least partially disposed in the second cavity.

19. The apparatus of claim 1, further comprising a termination block coupled to the pump waveguide, wherein the termination block is configured to absorb light from the laser.

20. The apparatus of claim 1, wherein the glass substrate comprises borosilicate glass or fused silica.

21. The apparatus of claim 1, wherein the laser is a diode laser disposed in a cavity defined in the glass substrate.

22. The apparatus of claim 1, wherein the element is selected from the group consisting of neodymium, europium, ytterbium, thulium, and dysprosium.

23. The apparatus of claim 1, wherein the laser has a wavelength of approximately 980 nanometers, approximately 1480 nanometers, or between 1010 nanometers and 1040 nanometers.

24. The apparatus of claim 1, wherein the signal in the signal waveguide has a center wavelength between 1260 nanometers and 1360 nanometers or between 1530 nanometers and 1565 nanometers.

25. The apparatus of claim 1, wherein the PIC die comprises a PIC signal waveguide coupled to the signal waveguide of the glass substrate, wherein the signal waveguide of the glass substrate is coplanar with the PIC signal waveguide.

* * * * *